(12) United States Patent
Oishi et al.

(10) Patent No.: US 6,772,430 B2
(45) Date of Patent: Aug. 3, 2004

(54) CARTRIDGE HOUSING A RECORDING MEDIUM AND DRIVE DEVICE FOR RECORDING MEDIUM

(75) Inventors: Kengo Oishi, Kanagawa (JP); Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 262 days.

(21) Appl. No.: 10/143,821

(22) Filed: May 14, 2002

(65) Prior Publication Data

US 2002/0172140 A1 Nov. 21, 2002

(30) Foreign Application Priority Data

| May 31, 2001 | (JP) | 2001-165704 |
| May 15, 2001 | (JP) | 2001-145506 |
| Sep. 28, 2001 | (JP) | 2001-304057 |

(51) Int. Cl.$^7$ ............................................. G11B 7/26
(52) U.S. Cl. ........................................ 720/729; 360/133
(58) Field of Search ........................... 369/291; 360/71, 360/133

(56) References Cited

U.S. PATENT DOCUMENTS

| 4,995,029 A | * 2/1991 | Kobayashi et al. | ......... 369/291 |
| 5,638,228 A | * 6/1997 | Thomas, III | ............... 360/60 |
| 6,297,923 B1 | * 10/2001 | Burnside et al. | ............... 360/69 |
| 2002/0176341 A1 | * 11/2002 | Ko et al. | .............. 369/53.21 |

FOREIGN PATENT DOCUMENTS

| JP | 11-312353 | 9/1999 |
| JP | 2000-30394 | 1/2000 |
| JP | 2000-30395 | 1/2000 |
| JP | 2000-30396 | 1/2000 |
| JP | 2000-30397 | 1/2000 |
| JP | 2000-30398 | 1/2000 |
| JP | 2000-30399 | 1/2000 |
| JP | 2000-90626 | 3/2000 |
| JP | 2000-90627 | 3/2000 |
| JP | 2000-90628 | 3/2000 |

* cited by examiner

*Primary Examiner*—David Ometz
*Assistant Examiner*—Mark Blouin
(74) *Attorney, Agent, or Firm*—Sughrue Mion, PLLC

(57) ABSTRACT

A disk cartridge has a write protect portion for switching between a write-allowed state and a write-inhibited state. The write protect portion is equipped with two prisms having reflection faces different in reflectivity which are rotatably supported therein. In a drive device in which the disk cartridge is loaded, an amount of light, which is irradiated to the write protect portion and then reaches a photodetecting portion of the drive device, is varied by rotating a shaft. On the basis of the amount of the light reaching the photodetecting portion, the drive device judges whether the disk cartridge is in a write-inhibited state. According to the disk cartridge, dust-proof performance is not lost, and occurrence of mis-detection due to deformation of the disk cartridge can be prevented.

11 Claims, 25 Drawing Sheets

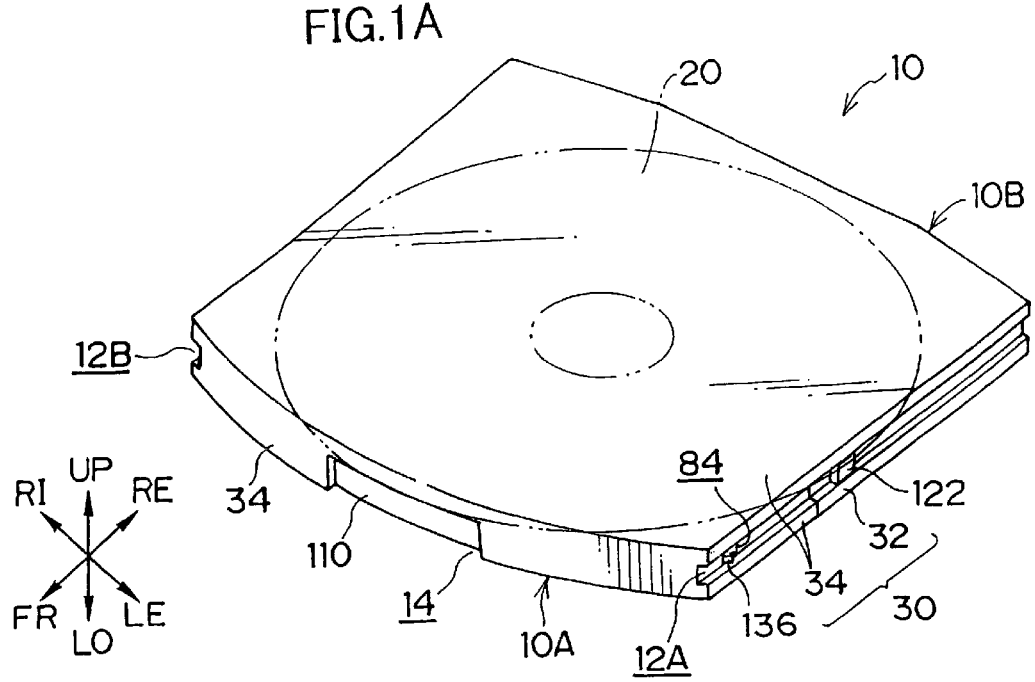
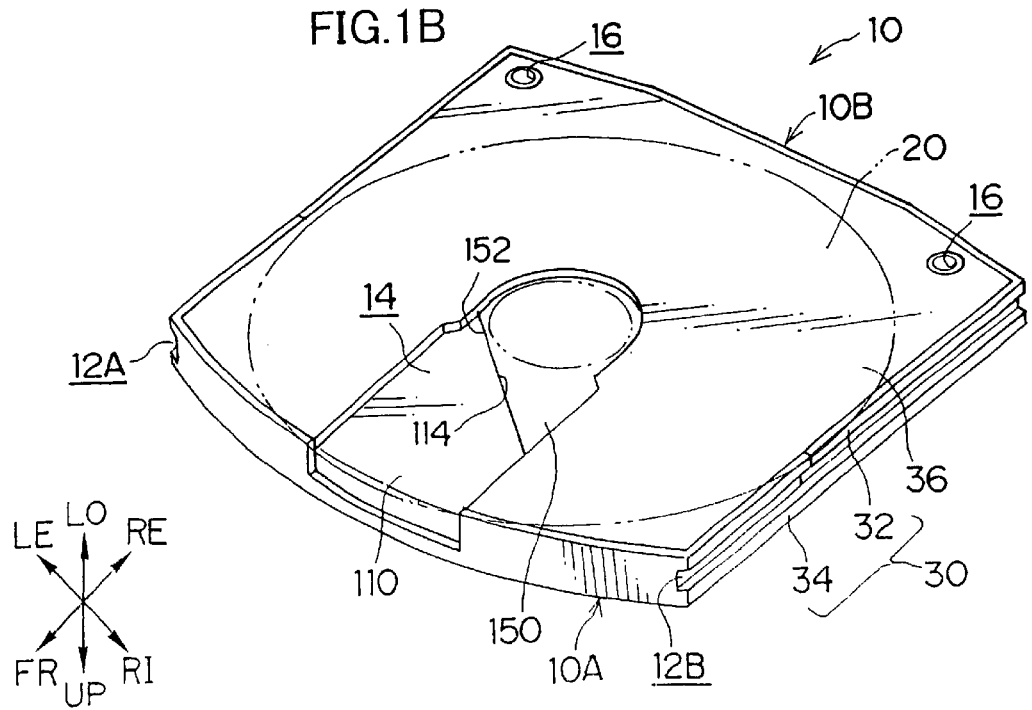

FIG.5
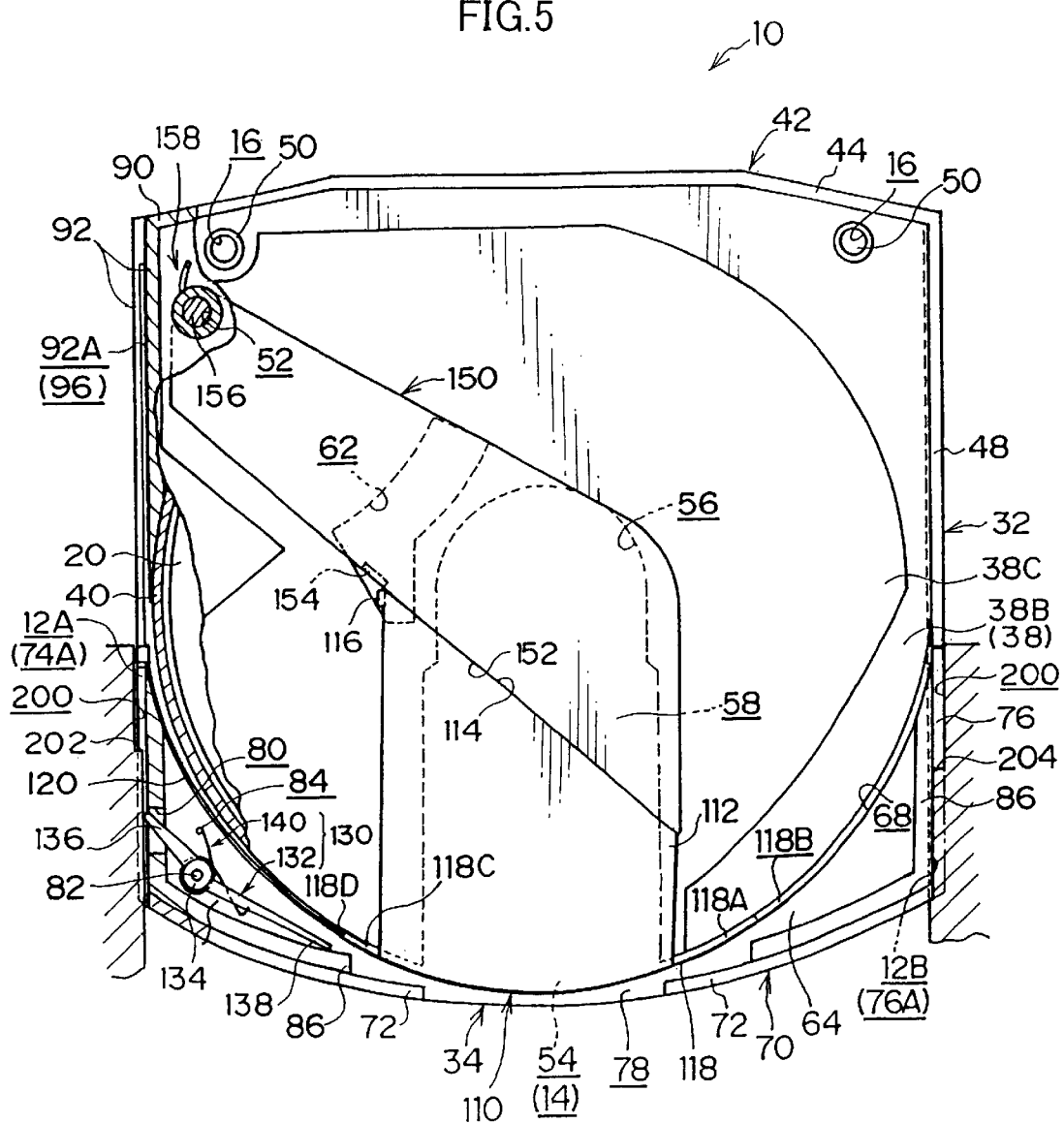
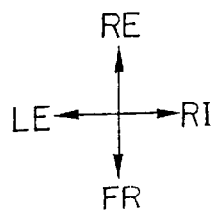

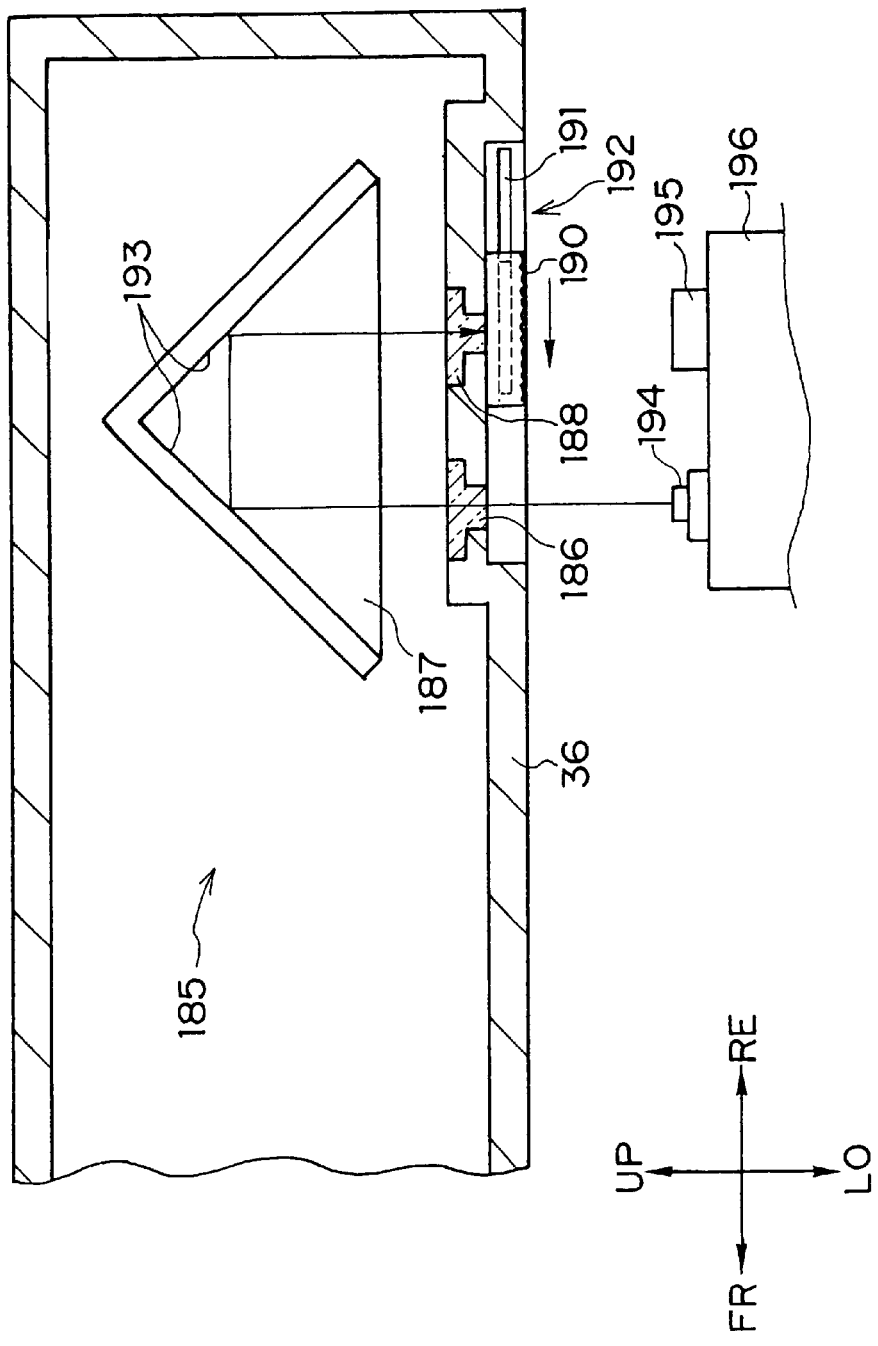

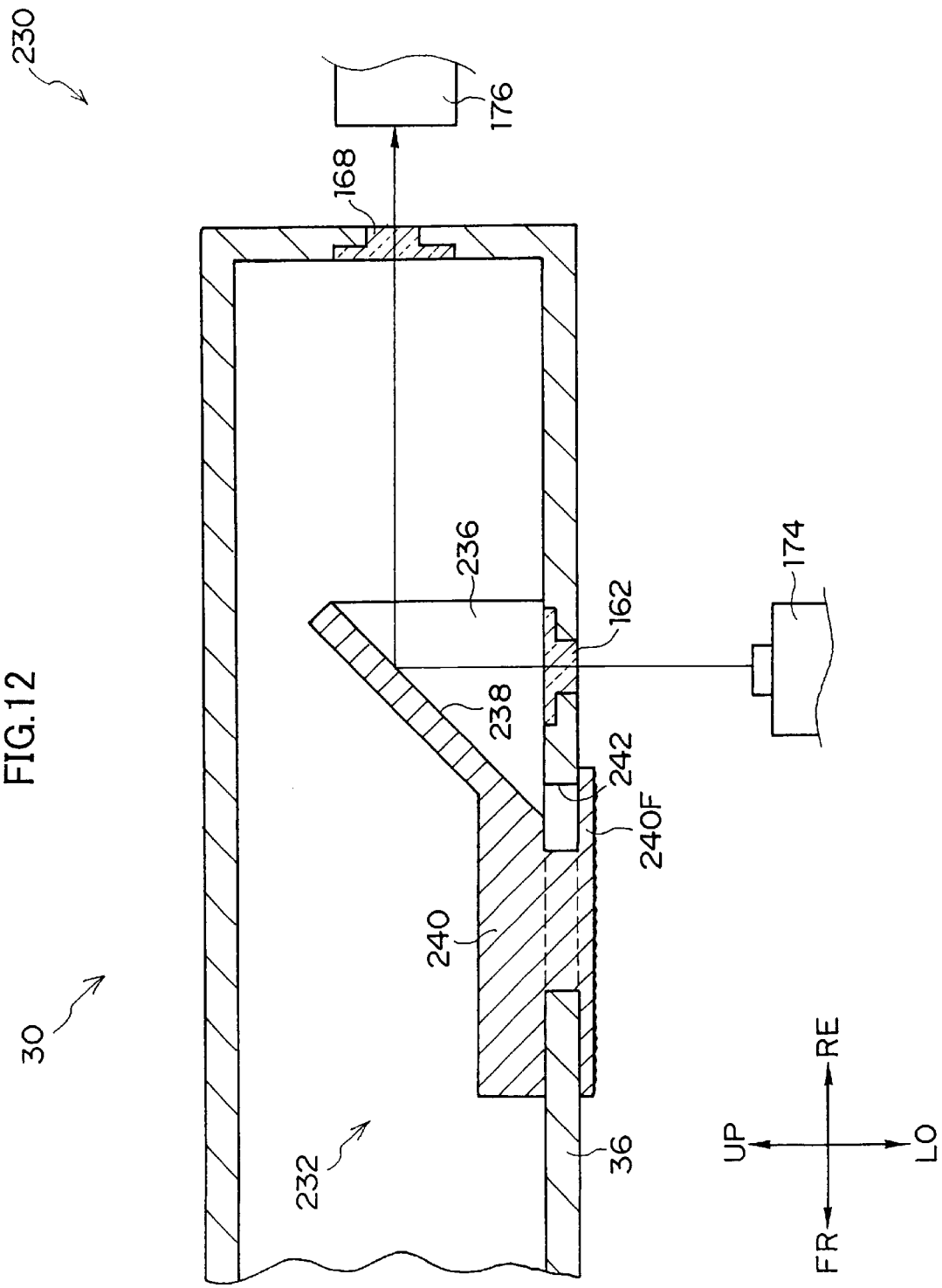

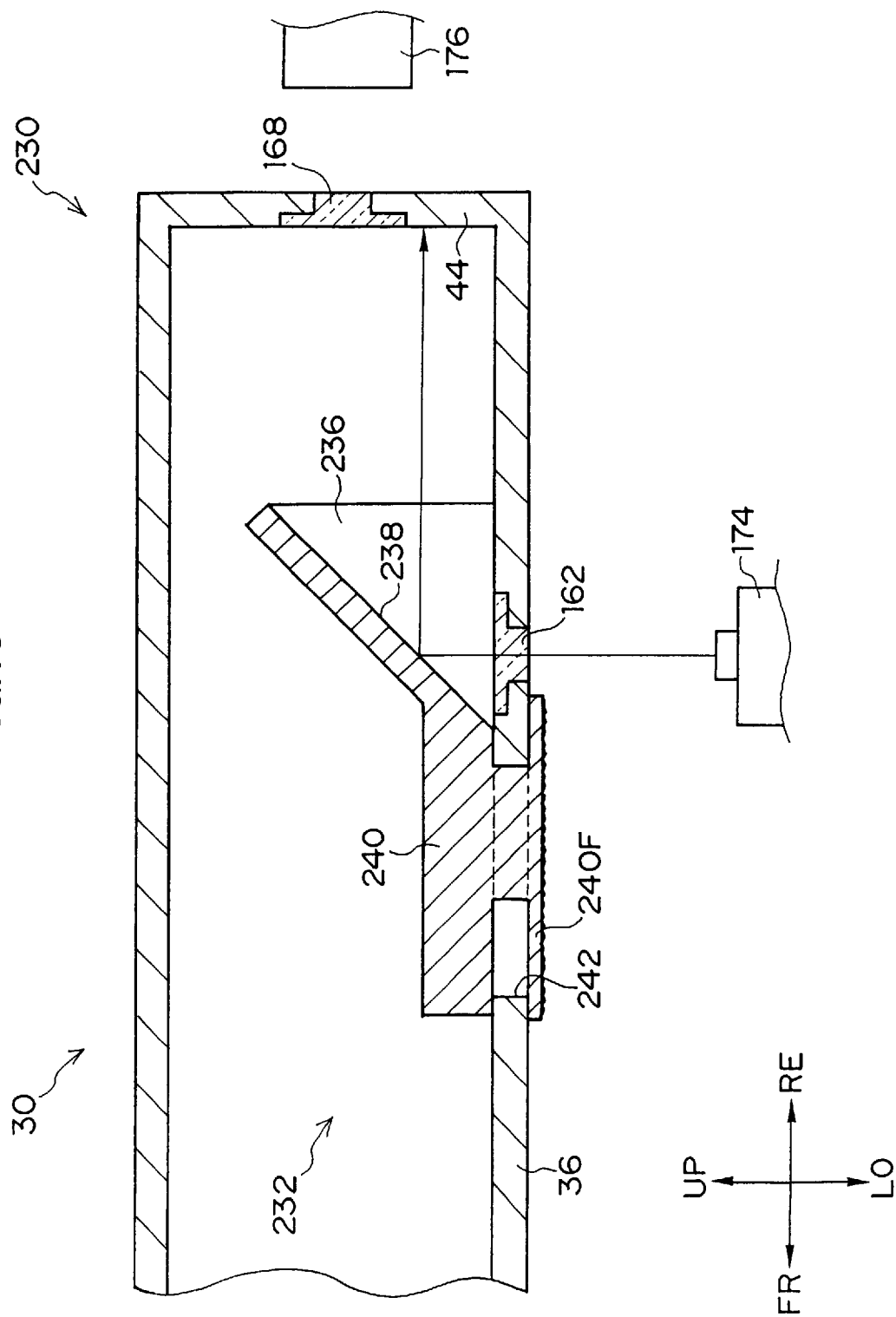

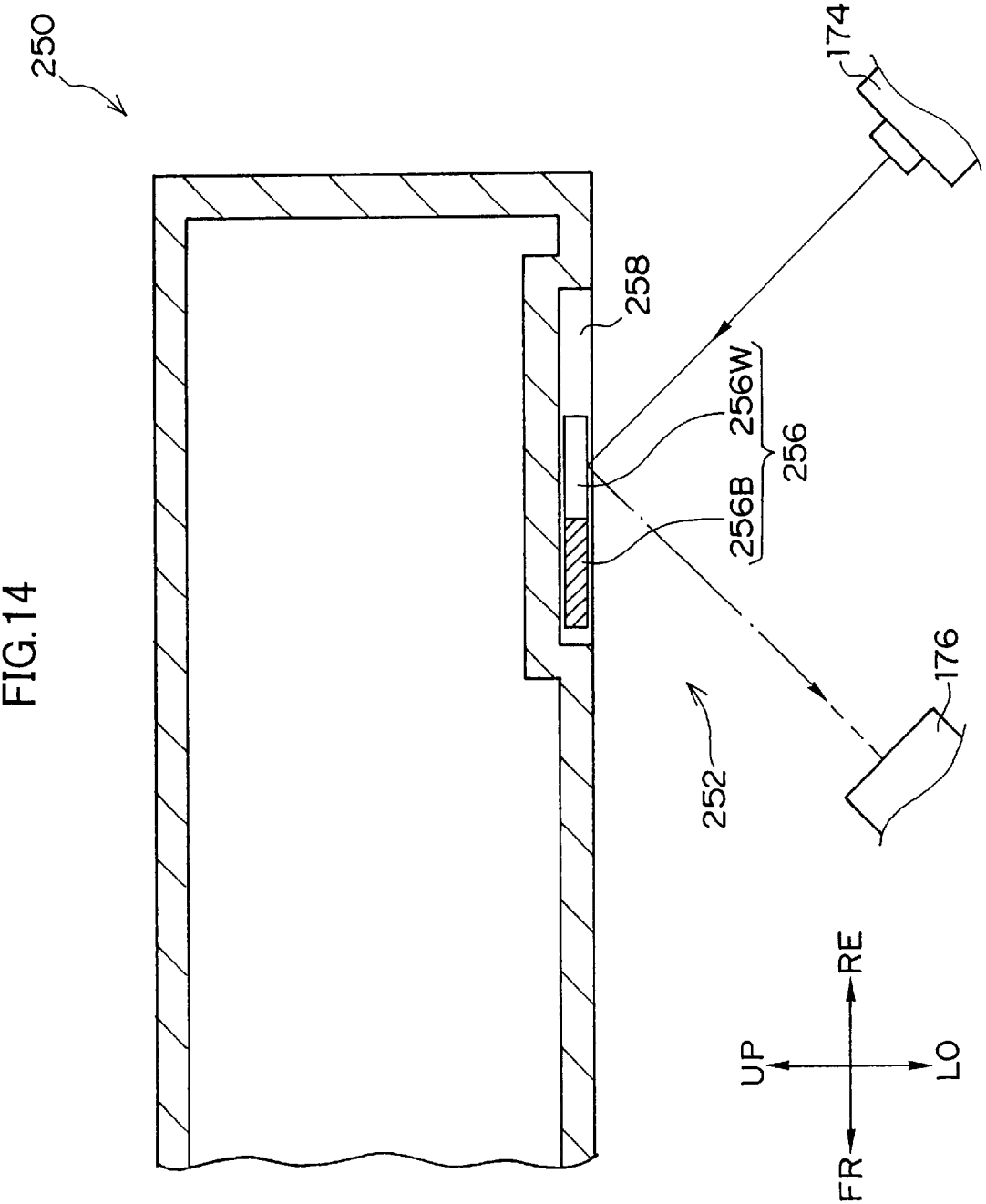

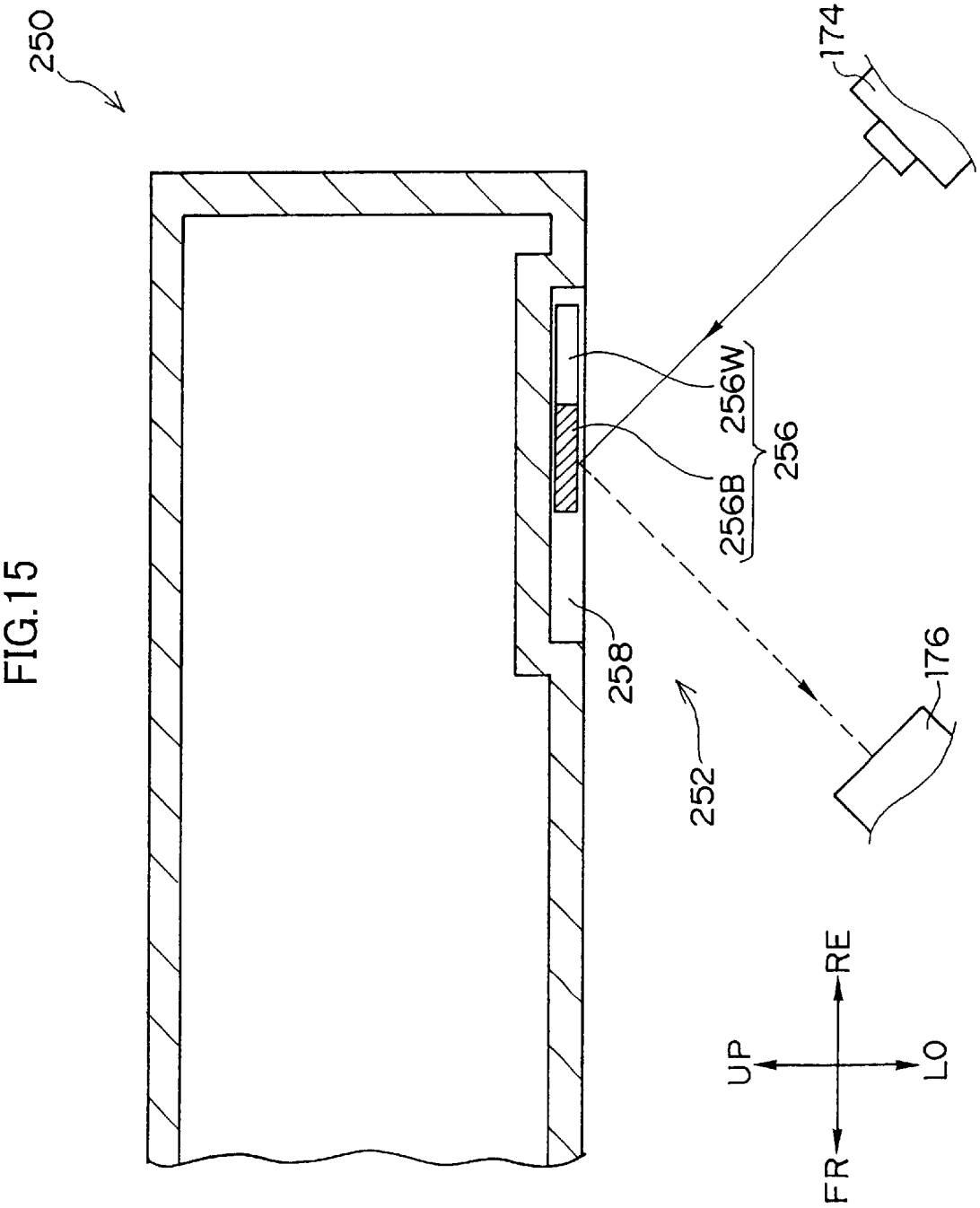

FIG.18A
FIG.18B
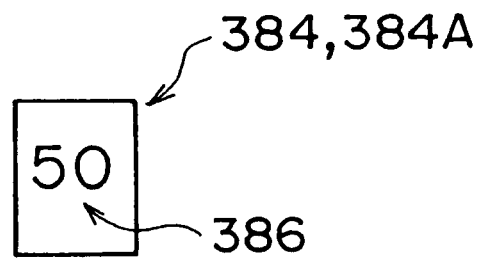
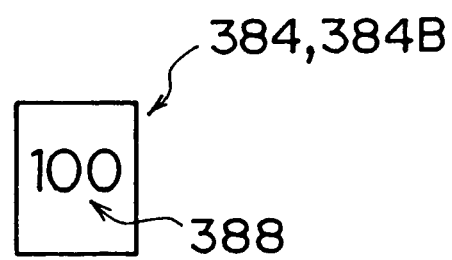

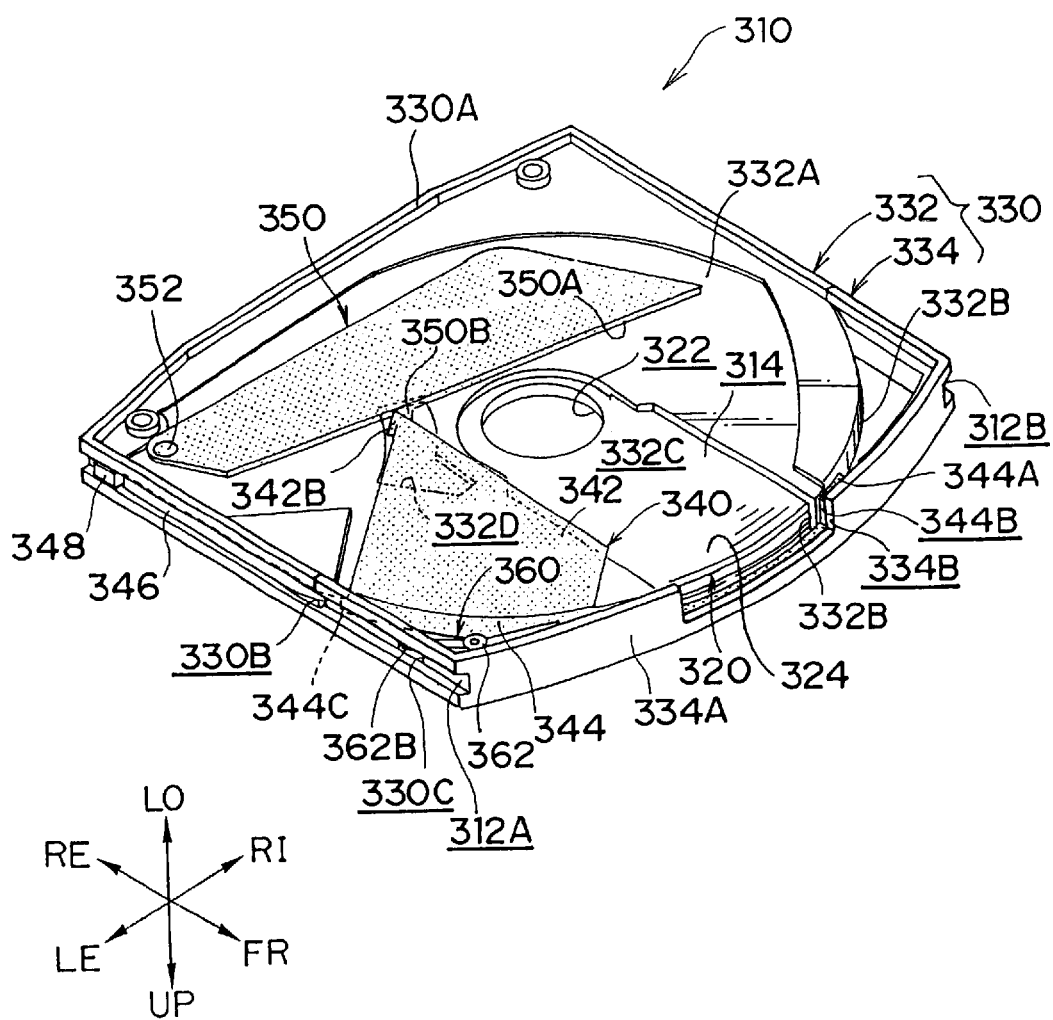

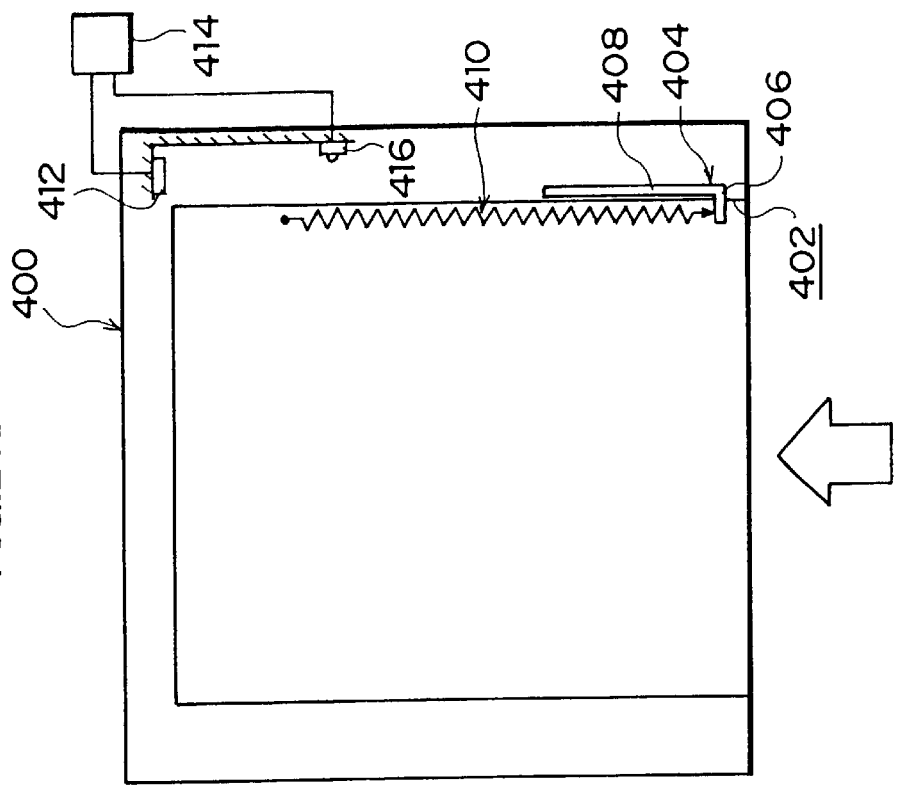
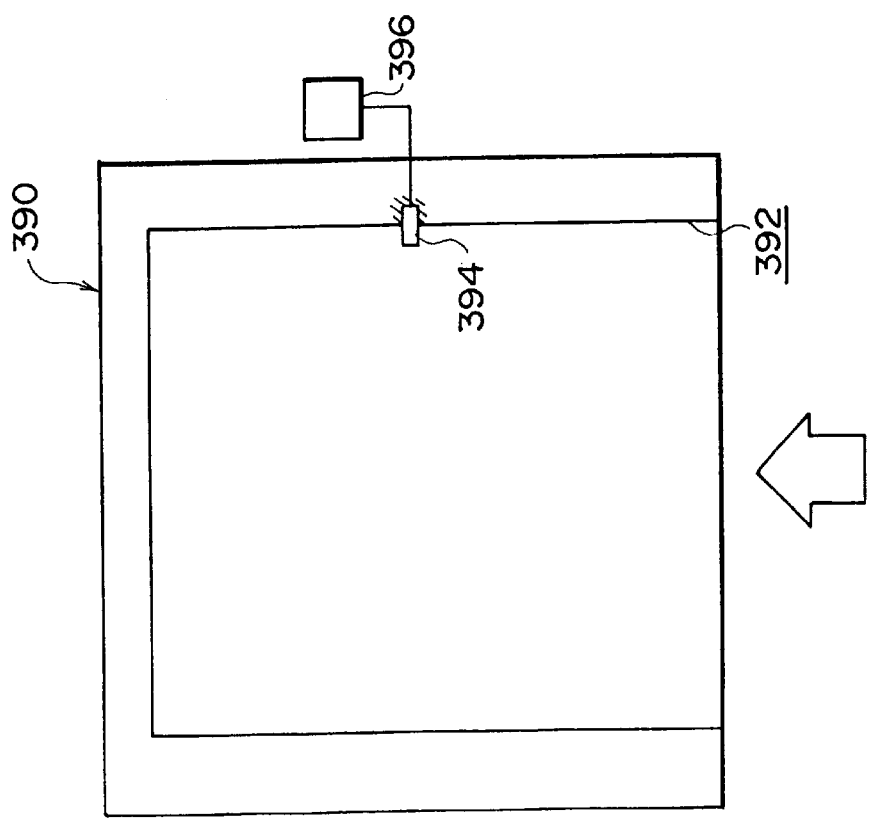

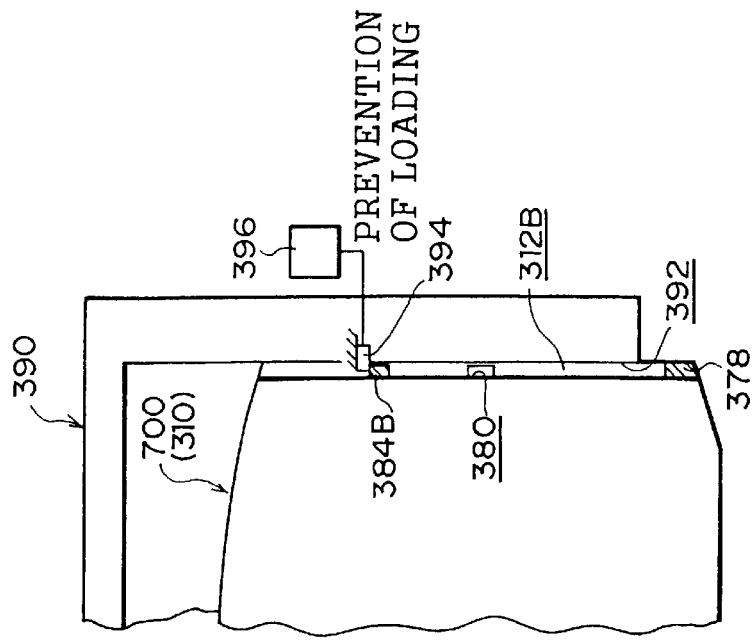
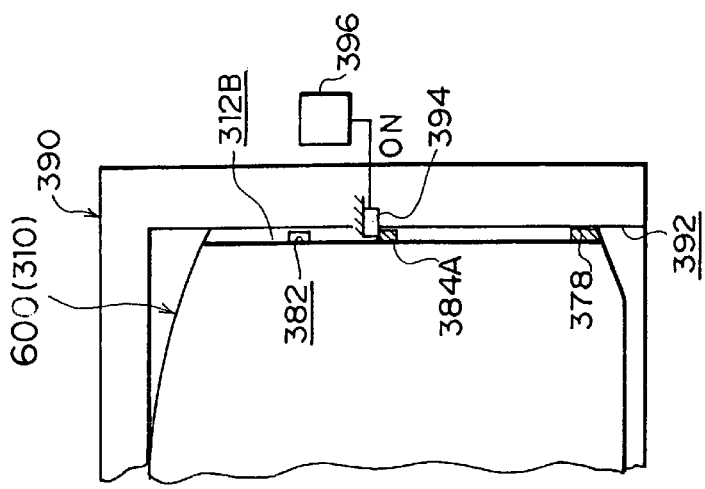
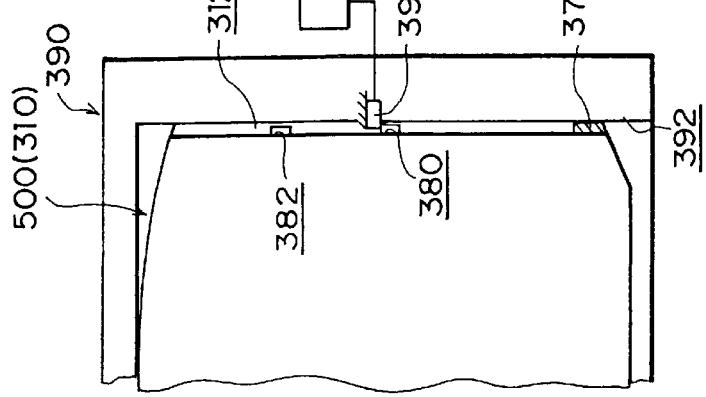

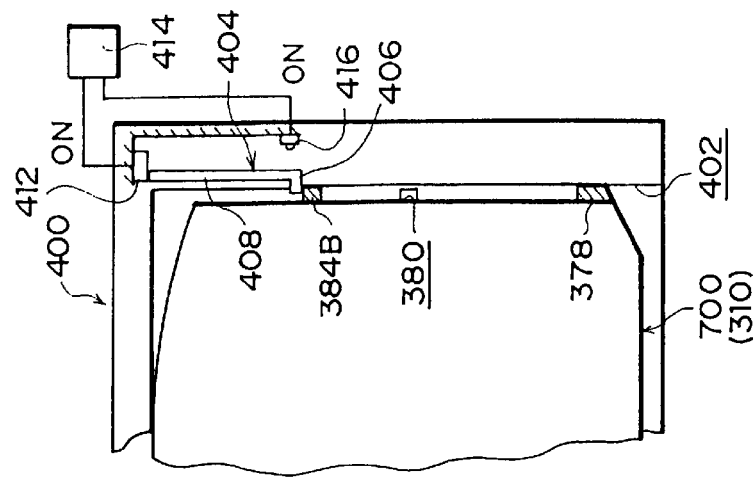
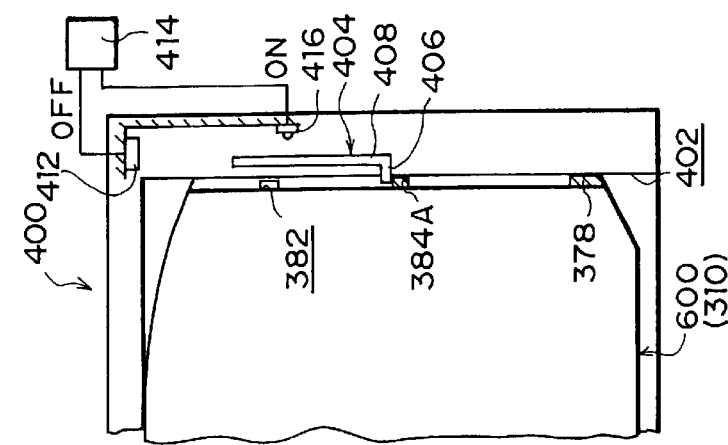
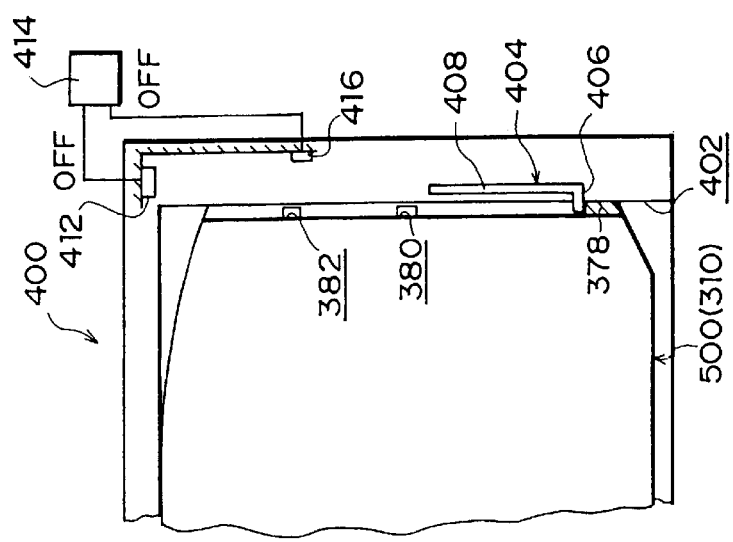

CARTRIDGE HOUSING A RECORDING MEDIUM AND DRIVE DEVICE FOR RECORDING MEDIUM

BACKGROUND OF THE INVENTION

1. Field of the Invention

The present invention relates to a cartridge, which houses a recording medium and has a write protect portion for switching between a write-allowed state and a write-inhibited state, and a drive device using the same.

2. Description of the Related Art

Disk-type media, such as an optical disk, a magneto-optical disk, etc. have been used as recording/reproducing media for portable computers, for example. When information is to be recorded into or reproduced from such a disk medium, the disk medium is loaded in a disk drive and a laser beam is irradiated onto a recording face of the disk medium while the disk medium is being rotated. The recording of the information on the disk medium is performed by a formation of pits due to decomposition of a dye layer, phase variation, magnetization or the like, of the recording face. The recorded information is reproduced from the disk medium on the basis of variation in reflectivity or polarization angle of the laser beam.

In order to enhance the storage capacity of this disk media, shortening the wavelength of a laser beam to be irradiated onto the recording face has been proposed. When information recording or reproduction is carried out using a short-wavelength laser beam, for example, a blue-violet laser beam, the laser beam is attenuated by a cover layer for protecting the recording face of the disk medium. In order to suppress the attenuation of the laser beam due to the cover layer, the thickness of the cover layer is required to be small. When the thickness of the cover layer is reduced as described above, the diameter of the spot of the laser beam on the surface of the cover layer (a surface exposed to the outside) is reduced, so that the influence of dust or the like adhering to the surface of the cover layer cannot be ignored.

Therefore, a disk cartridge having a case which houses a disk medium to prevent adhesion of dust or the like to the disk medium has been adopted. This disk cartridge is structured to have an opening through which the center hole portion formed at the center portion of the disk medium and a part of the recording face (cover layer) of the disk medium are exposed to the outside, and a shutter member for opening and closing the opening. With this construction, the opening of the disk cartridge is closed by the shutter member when the disk medium is not being used, thereby preventing an invasion of dust or the like into the disk cartridge, that is, the adhesion of dust or the like to the disk medium. When the disk medium is being used, the closing of the opening by the shutter member is released in connection with the loading of the disk cartridge into the disk drive device, so that the center hole portion of the disk medium can be held by a rotating spindle shaft and a laser head for irradiating a laser beam onto the recording face of the disk medium can approach the disk medium.

The disk cartridge described above comprises a write protection portion for preventing an mis-deletion of data recorded on a disk medium. Further, the write protect portion includes a switching member for switching between a write-allowed state (in which data can be written into the disk medium) and a write-inhibited state (in which data cannot be written into the disk medium).

For example, as shown in FIGS. 24 and 25, a compact tabular mis-deletion preventing plug 862 serving as the switching member is fitted in a recess portion 872 formed in the case 870 of a disk cartridge 860 so as to be slidable along the surface of the case 870. A through-hole 874 is formed in the recess portion 872. When the mis-deletion preventing plug 862 is located at the write-inhibited position (unrecordable position), the through-hole 874 is exposed in the form of a small window to the outside. On the other hand, when the mis-deletion preventing plug 862 is located at the write-allowed position (recordable position), the through-hole 874 is closed and thus it is not exposed to the outside.

When data are to be written into the disk medium, the mis-deletion preventing plug 862 is shifted to the write-allowed position as shown in FIG. 24. Accordingly, when the disk cartridge 860 is loaded into a disk drive device (not shown), an abutting rod 876 disposed in the disk drive device abuts against the mis-deletion preventing plug 862 and the disk drive device recognizes that data are writable (recordable) into the disk medium.

On the other hand, when data writing is inhibited, the mis-deletion preventing plug 862 is shifted to the write-inhibited position as shown in FIG. 25. When the disk cartridge 860 is loaded into the disk drive device, the abutting rod 876 does not abut against the mis-deletion preventing plug 862, and is inserted into the through-hole 874, so that the disk drive device recognizes that data are inhibited from being written into the disk medium (i.e., write-inhibition).

When the disk cartridge is set to the write-allowed state and then loaded into the disk drive device, the abutting rod 876 provided to the disk drive device abuts against the mis-deletion preventing plug 862 at all times. Therefore, there is a problem that dust occurs at the abutting site and the dust control performance is lowered. Further, the surface shape of the mis-deletion preventing plug 862 varies mainly due to roughness caused by damage, wear-out, etc. of the surface of the mis-deletion preventing plug 862, and thus there is also a problem that the disk drive device carries out mis-detection, that is, it makes a mistake between the write-allowed state and the write-inhibited state.

This problem occurs not only in the disk cartridge, but also in general to cartridges in which a recording medium is housed.

Further, when disk media are designed in high density (normally, the track pitch or track width is reduced) and with enhancement of the storage capacity of the disk medium, a lower capacity disk drive device, which can support only disk media having lower storage capacity, can neither record information into higher capacity disk media (having a larger storage capacity) nor reproduce information from the disk media.

It is also preferable that information, such as pre-recorded information, and the like, which is recorded on disk media having lower recording capacities, be recordable and reproducible by a disk drive device, which also supports disk media having higher recording capacities. Namely, it is preferable that downward compatibility be established when there are multiple types of a disk cartridge, which have the same shape but accommodate disk media of different recording capacities. (Hereinafter, a higher storage capacity and a lower storage capacity will be referred to as, "higher capacity" and "lower capacity", respectively.)

A downward compatible disk drive device can recognize the storage capacity (track pitch or track width) of a loaded disk medium in the process of reading data recorded on the disk medium, and adjust the recording or reproducing state in accordance with the storage capacity of the disk medium. Accordingly, if the storage capacity of the disk medium can be specified before the data are read out from the disk medium, the adjustment corresponding to the storage capacity of the disk medium could be made in advance. Therefore, the idle time could be shortened, that is, the response of the disk drive could be enhanced.

From this viewpoint, a disk cartridge and a disk drive in which an identification hole for identification of storage capacity is provided to a case of the disk cartridge and the storage capacity of the disk medium is identified on the basis of a judgment as to whether a detection member of the disk drive device can be inserted into the identification hole or not are known. According to the disk cartridge and the disk drive device as described above, two different recording capacities can be distinguished from each other with a simple construction.

However, it is difficult in such a conventional storage capacity identifying technique to discriminate many different recording capacities from one another. Further, it is required to prepare for many cases in which identification holes are respectively located at different positions in accordance with the recording capacities of the disk media. This makes the parts management more cumbersome, and increases the number of metal molds used to manufacture cases, and the manufacturing cost of disk cartridges.

SUMMARY OF THE INVENTION

The present invention has been implemented in view of the above situation, and objects there of are to provide a cartridge for a recording medium, which cartridge can prevent mis-detection due to deformation of a write protect portion from occurring without lowering dust control performance and allows a disk drive device to identify the recording capacities of a plurality of different disk media using a simple construction, and a disk drive device using the disk cartridge.

In order to attain the above object, according to a first aspect of the present invention, there is provided a recording medium cartridge for use with a light source, the cartridge comprising: a case; a recording medium accommodated in the case for at least one of reading and writing information to and from the recording medium; a write protection portion formed on the case, the write protection portion including a switching means, which, when receiving light from the light source, re-radiates the light in one of first and second amounts, the first amount indicating that information may be written to the recording medium, and the second amount indicating that information cannot be written to the recording medium, wherein the switching means is operable for selecting which light amount to re-radiate.

The drive device in which the cartridge is loaded to write/read data includes a light emitting portion and a photodetecting portion for detection light used to detect the state of the cartridge, and on the basis of the amount of detection light, which is emitted from the light emitting portion and reaches the photodetecting portion, it is judged to which of the write-allowing mode and the write-inhibiting mode the write protection mode of the recording medium corresponds.

The drive device, in which the cartridge is loaded, may generally identify the write protection mode (the write-allowing mode or the write-inhibiting mode) of the recording medium by judging whether the amount of light reaching the photodetecting portion is above a set value or whether a ratio of the amount of light reaching the photodetecting portion to the amount of light emitted from the light emitting portion is above a set value.

According to the cartridge of the first aspect of the present invention, a member which abuts the write protect portion of the cartridge when the cartridge is loaded in the drive devices is not provided. Therefore, generation of dust in the drive device can be remarkably prevented, and occurrence of mis-detection due to deformation of the write protect portion can also be prevented.

In the cartridge of the first aspect of the present invention, the switching means of the write protect portion may be a deflector, which changes the rate of light reaching the photodetecting portion by switching (varying) a position thereof. The switching of the position of the deflector may be performed by reciprocally moving the deflector in a horizontal direction or a vertical direction or by rotating the deflector. This construction simplifies the structure of the switching means.

Further, the deflector may be a prism. In this case, the deflector can be designed in a compact size. The prism may be rotatably provided so that the position of a prism face can be switched by rotating the prism. Accordingly, the rate of light reaching the photodetecting portion can be switched by a simple operation.

Still further, the deflector may be a reflecting mirror, which enables the deflector to have a compact design and also greatly reduces the manufacturing cost thereof. In addition, the reflecting mirror may be slidably provided so that the location of the reflecting mirror is switched by sliding the reflecting mirror. Accordingly, the structure can be simplified and the rate of light reaching the photodetecting portion can be switched by a simple operation.

The deflector may be housed in the case, and the case may be equipped with an incident light transmissible plate, which transmits the detection light emitted from the light emitting portion therethrough and alows the detection light thus transmitted to reach the deflector, and an emission-light transmissible plate, which transmits the detection light returned from the deflector therethrough and allows the detection light thus transmitted to reach the photodetecting portion. This construction can prevent dust from invading from the outside of the case through the travel passage of the detection light into the case.

The switching means may be an interception plate, which can be switched to enter into or retract from the optical path of the detection light emitted from the case. In this case, the arrival rate described above can be switched by an extremely simple means.

Further, the switching means may be a reflecting member comprising sites, which have different reflectivities for the detection light. In this case, the rate of light arriving can be switched by switching the locating positions of the sites. Accordingly, the construction of the switching means can be simplified, and the cost of the switching means can be greatly reduced.

Still further, the reflecting member may comprise a transparent member and an opaque member, or a white site and a black site. These members may be formed integrally with each other or separated from each other insofar as the locating positions thereof are switched.

In the cartridge of the first aspect of the present invention, the recording medium may be a disk medium. In the disk cartridge, the above effects can be achieved.

According to a second aspect of the present invention, there is provided a recording medium cartridge, the cartridge comprising: a case; a recording material having a storage capacity, the recording material being accommodated in the case and usable for at least one of reading and writing information to and from the recording medium; and a capacity indicating portion formed on the case at one of a plurality of positions, in accordance with the storage capacity of the recording material.

In the cartridge of the second aspect of the present invention, when a disk medium is used, the disk medium is loaded as a disk cartridge into a disk drive device in a loading direction. When the disk medium is loaded in the disk drive device, the storage capacity of the disk medium can be identified by the disk drive device on the basis of the position of the capacity indicating portion disposed at the position corresponding to the storage capacity of the disk medium on a predetermined reference line along the loading direction (the position of the capacity indicating portion in the loading direction).

Here, the capacity indicating portion is merely disposed at the position corresponding to the storage capacity of the disk medium on the reference line, and the disk drive device identifies the storage capacity of the disk medium on the basis of the position of the capacity indicating portion, in other words, the capacity indicating portions of the respective disk cartridges in which disk media having different recording capacities are housed are located on the common reference line in the disk drive device. Therefore, if the identifying means for identifying each of the different recording capacities is disposed along the reference line, the recording capacities of the disk media can be identified on the basis of the positions of the different capacity indicating portions.

As described above, the drive device is able to identify the recording capacities of different disk media with a simple construction.

The disk cartridge described above may be modified so that, when the storage capacity of the disk medium is larger than a predetermined storage capacity permitted by the drive device, the capacity indicating portion projecting from the outside of the case interferes with the identifying means equipped at the drive device side to identify the capacity indicating portion when the disk cartridge is loaded into the drive device, thereby preventing the disk cartridge from being loaded into the drive device.

In the cartridge (disk cartridge) thus constructed, when the storage capacity of a disk medium is larger than a predetermined storage capacity set in the drive device (disk drive device), that is, when the disk medium is an upper type medium with respect to the disk drive device, the capacity indicating portion projecting from the outside of the case interferes with the identifying member of the disk drive device, for example, through fitting, fixedly fitting, abutting, engagement or the like, thereby preventing the cartridge from being loaded into the disk drive device.

Accordingly, the disk cartridge is prevented from being loaded into a lower type disk drive device which cannot record or reproduce information into or from the disk medium housed in the disk cartridge. An upper type disk cartridge (disk medium) into/from which recording/reproduction cannot be carried out by the disk drive device is prevented from being loaded into the disk drive device, and thus it is unnecessary to identify the storage capacity of the upper type disk medium housed in the disk cartridge, so that the construction can be simplified. In addition, erroneous identification of the storage capacity, which would occur if a disk cartridge having an upper type disk medium having a large storage capacity is loaded in the disk drive device, can be prevented with certainty.

The case may be designed to have a fixing portion to which the capacity indicating portion is detachably secured. In the cartridge (disk cartridge) thus constructed, since the fixing portion is provided to the case, the capacity indicating portion can be detached. Accordingly, the same type of case can be shared by the plurality of disk media having different recording capacities.

A small capacity indicating portion for small recording capacities may be formed integrally with the case so as to be located at the rear end, in the loading direction, of the case while the fixing portion is provided more to the front end of the case in the loading direction, with respect to the small capacity indicating portion. With this construction, disk cartridges having various recording capacities ranging from a small storage capacity to a large storage capacity can be implemented using the cases having the same construction.

More specifically, a case for a large storage capacity can be constructed by securing another capacity indicating portion corresponding to the large storage capacity to the fixing portion. Further, by securing another capacity indicating portion corresponding to the intermediate storage capacity between the small storage capacity and the large storage capacity to the fixing portion, a case for the intermediate storage capacity or a storage capacity slightly larger than the intermediate storage capacity can be constructed. If none of the other capacity indicating portions are secured to the fixing portion, a case for the small storage capacity is constructed. Further, the capacity indicating portion for the small storage capacity may also be secured to the fixing portion for the small storage capacity separately from the case.

As described above, according to the cartridge (disk cartridge) thus constructed, the case can be shared, so that the parts management can be easily performed, the number of metal molds can be reduced and thus the manufacturing cost can be reduced. Further, the case can be recycled as a product, and this is more suitable.

The capacity indicating portion may be designed to have an identifiable mark with which the storage capacity of the disk medium can be visually identified.

In the cartridge (disk cartridge) thus constructed, the storage capacity of the disk medium housed in the cartridge can be visually checked easily because the identifying mark is provided to the capacity indicating portion. That is, the storage capacity of the disk medium can be checked without loading the disk cartridge into the disk drive device, which is convenient. Further, printing or stamping on the case, attachment of a label onto the case, etc. can be abolished, and the case can be more readily shared. Stamping (shaping) or printing of characters or symbols on the capacity indicating portion, coloring, and shaping of the capacity indicating portion itself, etc. may be used as the identifying mark.

The present invention provides, according to a third aspect thereof, a drive device for receiving a recording medium cartridge, wherein the cartridge includes a capacity indicating portion disposed thereon, which denotes a storage capacity of the cartridge, the drive device comprising: an accommodating portion for accommodating the cartridge and at least one of reading and writing information to and from the cartridge; and an identifying means for identifying the capacity indicating portion, and identifying the storage capacity.

A drive device is provided in which a cartridge is accommodated, the cartridge being equipped with a case in which a disk-shaped disk medium is rotatably housed, and a capacity indicating portion provided at a predetermined position corresponding to the storage capacity of the disk medium on a predetermined reference line along the loading direction of the case, characterized by including identifying means for identifying the storage capacity of the disk medium in accordance with the position of the capacity indicating portion of the cartridge loaded in the drive device.

In the drive device (disk drive device) thus constructed, when the cartridge (disk cartridge) is loaded, the identifying means identifies the storage capacity of the disk medium on the basis of the position of the capacity indicating portion of the disk cartridge disposed at the position corresponding to the storage capacity of the disk medium on the reference line along the loading direction (i.e., a depth to which the capacity indicating portion in the drive device is loaded, or loading depth).

Here, the identifying means merely identifies the storage capacity of the disk medium on the basis of the position (the loading depth) of the capacity indicating portion in the disk drive device, the capacity indicating portion being disposed at the position corresponding to the storage capacity of the disk medium on the reference line. In other words, the capacity indicating portions of respective disk cartridges in which disk media having different recording capacities are housed are each located at the different positions on the common reference line in the disk drive device, and thus if the identifying means for identifying the different recording capacities is disposed along the reference line in the disk drive device, the disk drive device can detect the position of each capacity indicating portion with a simple construction.

As described above, according to the drive device, particularly the disk drive device thus constructed, the storage capacity of the disk medium housed in the disk cartridge can be identified with a simple construction.

The drive device may be modified so that when the storage capacity of the disk medium is larger than a predetermined storage capacity, the identifying means interferes with the capacity indicating portion projecting from the case to thereby prevent the cartridge from being loaded into the drive device.

In the drive device (disk drive device) thus constructed, when the storage capacity of the disk medium is larger than the predetermined storage capacity, that is, when the disk medium is an upper type disk medium with respect to the disk drive device, the identifying means interferes with the capacity indicating portion to prevent the loading of the cartridge (disk cartridge).

Accordingly, a disk cartridge containing an upper type disk medium, to/from which the recording/reproduction cannot be carried out by the disk drive device concerned, is prevented from being loaded into the disk drive device, and thus it is unnecessary to identify the storage capacity of the upper type disk medium housed in the disk cartridge. Therefore, the construction is simple. Further, erroneous identification of the storage capacity which would occur if a disk cartridge having an upper type disk medium having a large storage capacity is loaded in the disk drive device can be prevented with certainty.

For example, if a disk cartridge, which houses a disk medium having a larger storage capacity (higher-level type disk medium), is designed so that the capacity indicating portion is formed at a position nearer to the front end of the case on the reference line in the loading direction, the site of the identifying means, which interferes with the capacity indicating portion may be disposed on the movement locus of the capacity indicating portion (on the reference line in the loading direction).

As described above, in the drive device thus constructed, particularly, when disk drive devices, which respectively support various types (upper, middle, lower) of disk media having various recording capacities (large, middle, small), exist, the upper type disk media can be prevented from being erroneously loaded into the lower capacity disk drive devices (which support only disk media having small recording capacities), and data recorded on the upper type disk media can be prevented from being damaged. That is, a disk drive device having a protect function which prevents the loading of disk cartridges containing upper type disk media therein, can be achieved.

BRIEF DESCRIPTION OF THE DRAWINGS

FIG. 1A is a perspective view showing an appearance of a disk cartridge according to a first embodiment of the present invention, which disk cartridge is viewed from an upper front side, and FIG. 1B is a perspective view showing the appearance of the disk cartridge of FIG. 1A which disk cartridge is viewed from a lower front side.

FIG. 5 is a partially-cut-away bottom view when a lower plate portion is detached, which shows the disk cartridge in a lock released state according to the first embodiment of the present invention.

FIG. 11 is a side cross-sectional view showing the write protect portion of the disk cartridge according to the second embodiment of the present invention.

FIG. 12 is a side cross-sectional view showing a write protect portion of a disk cartridge according to a third embodiment of the present invention.

FIG. 13 is a side cross-sectional view showing the write protect portion of the disk cartridge according to the third embodiment of the present invention.

FIG. 14 is a side cross-sectional view showing a write protect portion of a disk cartridge according to a fourth embodiment of the present invention.

FIG. 15 is a side cross-sectional view showing the write protect portion of the disk cartridge according to the fourth embodiment of the present invention.

FIGS. 18A and 18B are front views showing capacity indicating blocks constituting the disk cartridge according to the fifth embodiment of the present invention, wherein FIG. 18A shows the capacity indicating block for a middle storage capacity, and FIG. 18B shows the capacity indicating block for a large storage capacity.

FIG. 20 is a perspective view showing the internal construction of the disk cartridge according to the fifth embodiment of the present invention when the opening is in the open state.

FIGS. 21A and 21B are schematic plan views showing the internal construction of a disk drive device in the disk cartridge according to the fifth embodiment of the present invention is loaded, wherein FIG. 21A shows the disk drive device for the middle storage capacity, and FIG. 21B shows the disk drive device for the large storage capacity.

FIGS. 22A, 22B and 22C are schematic diagrams showing the state when a disk cartridge is loaded in the disk drive device for the middle storage capacity according to the fifth embodiment of the present invention, wherein FIG. 22A shows a state when a disk cartridge for the small storage capacity is loaded, FIG. 22B shows a state when a disk cartridge for the middle storage capacity is loaded, and FIG. 22C shows a state when a disk cartridge for the large storage capacity is loaded.

FIGS. 23A, 23B and 23C are schematic diagrams showing the state when a disk cartridge is loaded in a disk drive device for the large storage capacity according to the fifth embodiment of the present invention, wherein FIG. 23A shows a state when a disk cartridge for the small storage capacity is loaded, FIG. 23B shows a state when a disk cartridge for the middle storage capacity is loaded, and FIG. 23C shows a state when a disk cartridge for the large storage capacity is loaded.

DESCRIPTION OF THE PREFERRED EMBODIMENTS

Preferred embodiments according to the present invention will be described hereinafter with reference to the accompanying drawings.

In the following embodiments, a disk cartridge is used as a cartridge for a recording medium. However, the present invention is not limited to the disk cartridge, and it may be applied to general cartridges for recording media, which include tape cartridges, etc.

First Embodiment

A disk cartridge 10 according to a first embodiment will be described with reference to FIGS. 1A to 13. First, the overall construction of the disk cartridge 10 will be described mainly with reference to FIGS. 1A to 7, and then a write protect portion 160 which is a main part of the present invention will be described with reference to FIGS. 8 to 13.

When an arrow FR, an arrow RE, an arrow UP, an arrow LO, an arrow RI, and an arrow LE are drawn in the figures, these arrows indicate the forward direction (loading direction), the backward direction, the upward direction, the downward direction, the rightward direction and the leftward direction with respect to the loading (insertion) direction of the disk cartridge 10 into a drive device, and when "FR", "RE", "UP", "LO", "RI" and "LE" are merely shown, these correspond to the directions of the respective arrows. Further, these directions are shown for convenience's sake, and they do not limit the directions of the disk cartridge 10 when the disk cartridge 10 is used. Accordingly, the disk cartridge 10 may be disposed horizontally or vertically when it is used.

Overall Construction of the Disk Cartridge

FIG. 1A is a perspective view showing the appearance of the disk cartridge 10 which is viewed from an oblique upper side, and FIG. 1B is a perspective view showing the appearance of the disk cartridge 10 which is viewed from an oblique lower side.

As shown in FIGS. 1A and 1B, the disk cartridge 10 is designed to be flat so that the front end portion 10A and the rear end portion 10B thereof respectively have, in plan view, an arcuately-curved shape and a substantially-polygonal shape with the right and left corners thereof being cut out in accordance with specifications and functions requested, and dimensions are slightly different between the front and rear sides and between the right and left sides. This structure of the disk cartridge 10 makes it easy to visually recognize the loading direction of the disk cartridge 10 into a drive device (not shown) from its appearance, and inhibits the disk cartridge 10 from being loaded into the drive device from an incorrect direction.

Further, a first guide groove 12A and a second guide groove 12B for guiding the disk cartridge 10 when the disk cartridge 10 is loaded into the drive device are formed on the right and left side surfaces of the disk cartridge 10.

Figure 2:
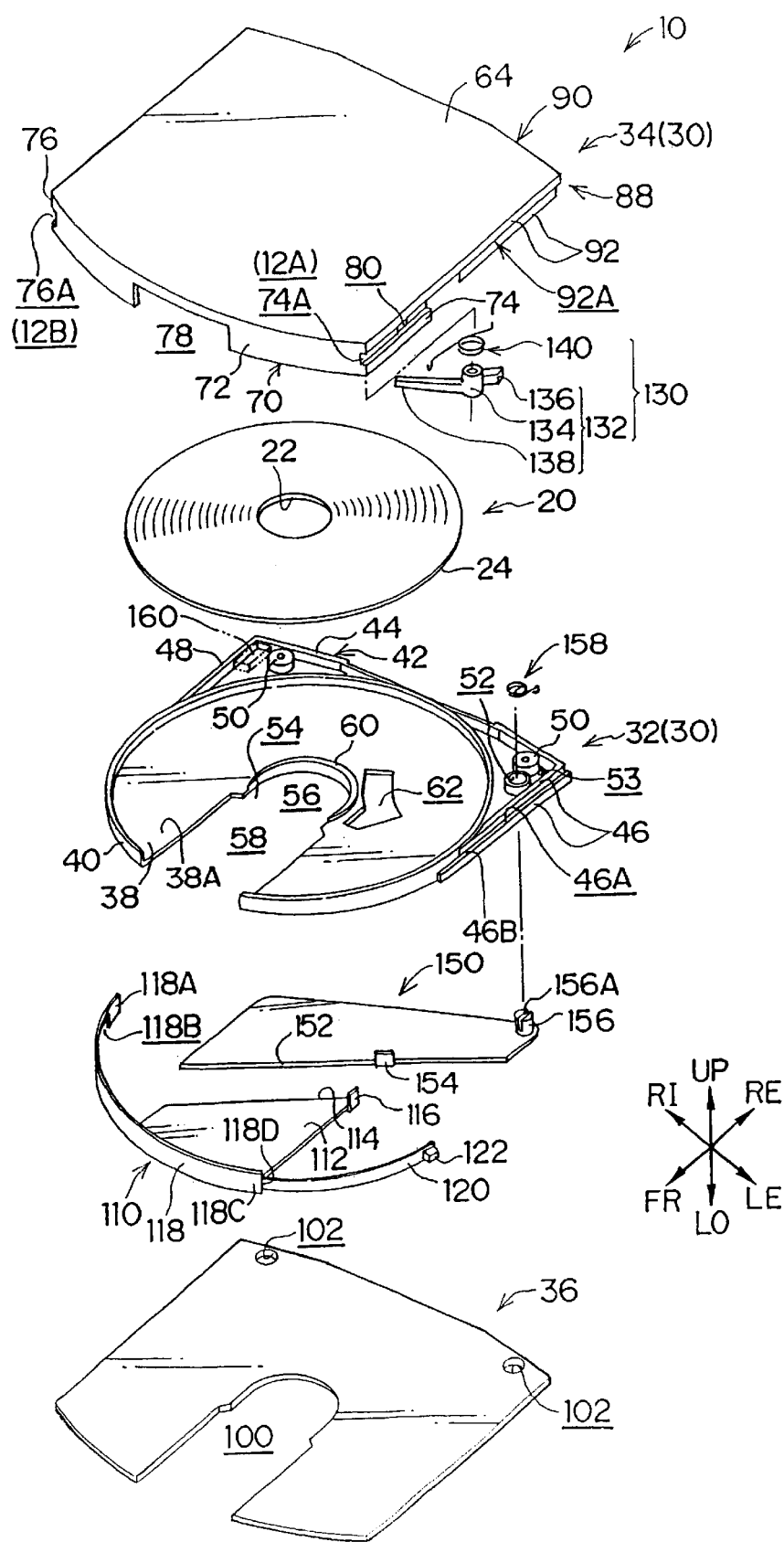
FIG. 2 is an exploded perspective view of the disk cartridge according to the first embodiment of the present invention, which disk cartridge is viewed from the upper side.
Figure 3:
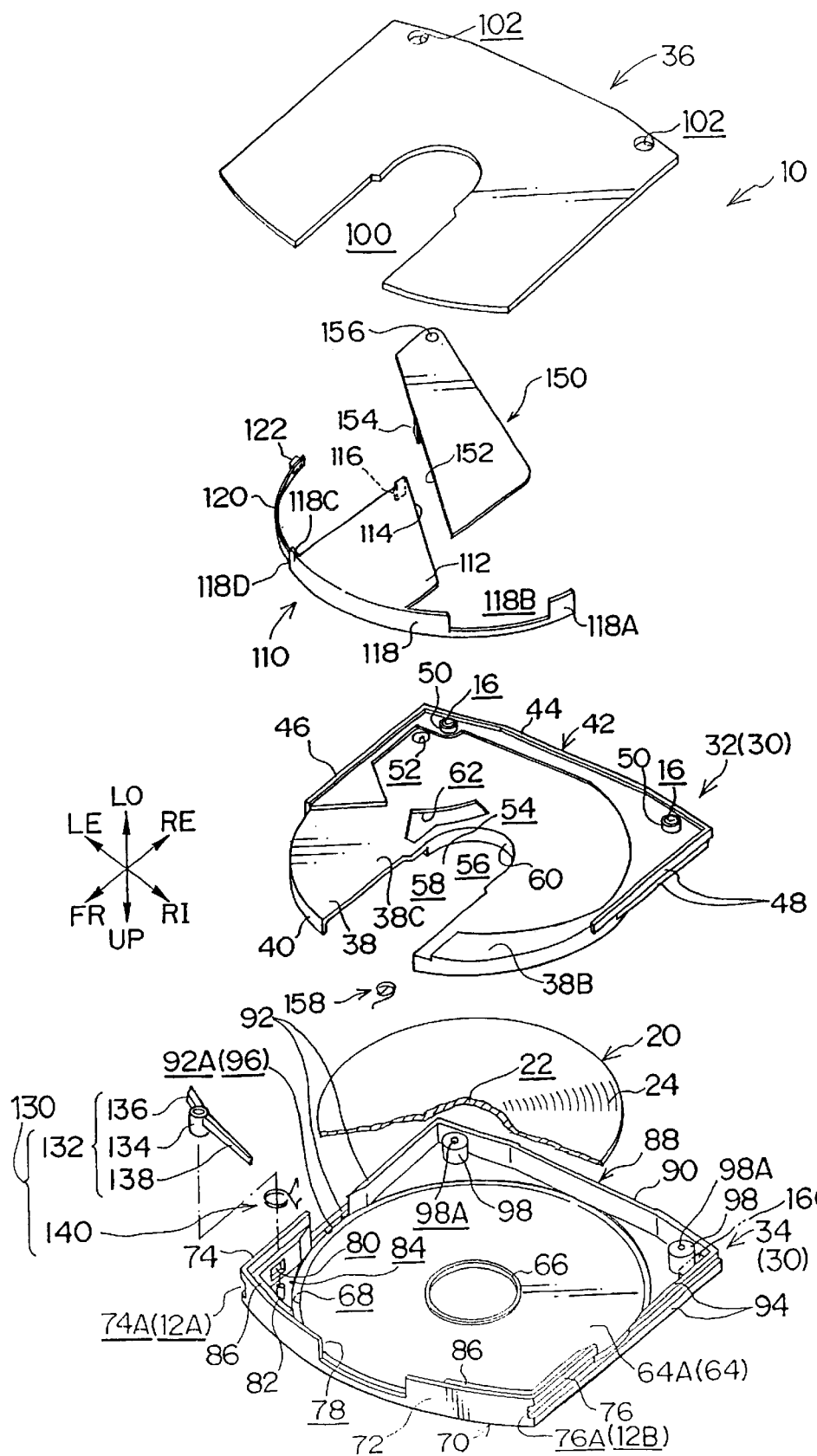
FIG. 3 is an exploded perspective view of the disk cartridge according to the first embodiment of the present invention, which disk cartridge is viewed from the lower side.

As shown in FIGS. 2 and 3, a disk-shaped medium (disk medium) 20 as a recording/reproducing medium is rotatably housed in the disk cartridge 10. The disk medium 20 housed in the cartridge 20 has a center hole 22 at a center portion thereof, and it is supported by a rotating spindle shaft of the drive device at the center hole 22. In addition, a recording face (not shown) formed on the lower surface 24 of the disk medium 20 is covered by a cover layer (not shown).

An opening 14 (see FIGS. 1A and 1B) is formed in the disk cartridge 10 so as to extend from the center portion of the lower surface of the cartridge 10 to the front end portion 10A (front face), and is used for accessing the disk medium 20 (to insert the rotating spindle shaft of the drive device and a recording/reproducing head). The opening 14 is opened/closed by a first shutter member 110 and a second shutter member 150 described later.

Further, two position regulating holes 16 are formed in the area of the rear end portion 10B of the lower surface of the disk cartridge 10 to regulate (detect) the position of the disk cartridge in the drive device.

The disk cartridge 10 has a case 30 (see FIGS. 1A to 3), which is constructed by joining a base plate portion 32 serving as a lower shell and a top plate portion 34 serving as an upper shell and in which a disk medium 20 is rotatably housed, and the lower portion of the case 30 is covered by the bottom plate portion 36 serving as a cover member.

As shown in FIGS. 2 and 3, the base plate portion 32 has a base bottom portion 38, which is formed of a thin plate and designed so that the front portion thereof has a semi-spherical shape and the rear portion thereof has a substantially rectangular shape. The base bottom portion 38 has a flat upper face 38A and a lower face 38B having a recess portion 38C, which is formed in connection with the moving range of the first shutter member 110 and the second shutter member 150.

A cylindrical wall 40 is formed at the upper face 38A side of the base bottom portion 38 so as to be coaxial with the semi-spherical portion of the front portion and have the same diameter as the semi-spherical portion, and the inner diameter of the cylindrical wall 40 is set to be slightly larger than the outer diameter of the disk medium 20.

A peripheral wall 42 is formed on the outer periphery of the rear portion of the base bottom portion 38 so as to surround substantially the rear half portion of the cylindrical wall 40. The rear wall 44 of the peripheral wall 42 constitutes a half of the rear end portion 10B of the disk cartridge 10.

Each of the left wall 46 and the right wall 48 of the peripheral wall 42 has a lower step formed at the outside thereof, and each step constitutes a half of the rear portion of the first guide groove 12A and second guide groove 12B of the disk cartridge 10. Further, an upwardly-opening slender groove 46A is formed at a stepwise corner portion of the left wall 46.

The peripheral wall 42 also projects downward at the lower face 38B side of the base bottom portion 38 so as to substantially surround the rear portion (see FIG. 3), and constitutes a site with which the bottom plate portion 36 will be engaged.

Two cylindrical projections 50 are formed between the cylindrical wall 40 and the peripheral wall 42 at both the right and left sides of the base bottom portion 38 so as to project towards the upper and lower sides. The lower portion of the inside of each cylindrical projection 50 constitutes a position regulating hole 16 of the disk cartridge 10, and the upper portion thereof is provided with a screw supporter (not shown) having a conical shape corresponding to the head portion of a fixing screw.

Further, a shutter shaft hole 52 and a spring holding portion 53 are provided in the region of the cylindrical projection 50 at the left side, and they are used to support the shaft of the second shutter member 150 and hold one end portion of a torsion spring 158 respectively, as described later.

An opening 54 constituting the opening 14 of the disk cartridge 10 is formed in the base plate portion 32. The opening 54 comprises a circular hub hole 56 having a diameter larger than the outer diameter of the center hole 22 of the disk medium 20, and a window portion 58 for the recording/reproducing head. The window portion 58 is designed to have a substantially rectangular shape in plan view, and is formed continuously with the hub hole 56 and extends to the front end portion of the base bottom portion 38 so that the cylindrical wall 40 is cut out by the window portion 58. A rib 60 is formed around the hub hole 56 on the upper face 38A, and serves to prevent contact between the lower surface 24 of the disk medium 20 and the upper face of the base bottom portion 38.

Further, a shutter guide hole 62 is formed in the region of the hub hole 56 of the base bottom portion 38. The shutter guide hole 62 is shaped so that the corner portion of a substantially arcuate hole whose center is coincident with the shutter shaft hole 52 extends outwardly.

The disk medium 20 is housed in the cylindrical wall 40 of the base plate portion 32 described above. The upper portion of the base plate portion 32 is covered by the top plate portion 34 such that the disk medium 20 is mounted on the rib 60.

The top plate portion 34 is equipped with a plate portion 64 corresponding to the outer sectional shape of the disk cartridge 10. An annular projection 66 (see FIG. 3) is formed at the center portion of the lower surface 64A of the flat plate portion 64 in connection with the rib 60 of the base plate portion 32, and is used to prevent the contact between the lower surface 64A and the disk medium 20.

An annular groove 68 is formed in the lower surface 64A of the flat plate portion 64 so as to correspond to the cylindrical wall 40 of the base plate portion 32. The annular groove 68 is formed so that the cylindrical wall 40 is insertable in the annular groove 68, and the outer diameter of the portion of the annular groove 68, which is located at the front side of the left wall 46 and the right wall 48 of the base plate portion 32, is set to a slightly larger diameter (broad), so that an arcuate guide wall portion 118 of the first shutter member 110 as well as the cylindrical wall 40 can be inserted into the annular groove 68.

Further, an outer wall 70, which is designed to be substantially U-shaped in plan view, is formed on the outer periphery of the front portion of the flat plate portion 64 so as to be erected downwardly. The height of the outer wall 70 is set in conformity with the total thickness of the disk cartridge 10, and the outer wall 70 comprises a front wall 72, a left wall 74 and a right wall 76.

The front wall 72 is curved in the form of an arc, and constitutes the front end portion 10A of the disk cartridge 10. A downwardly-opening and notched rectangular window portion 78 is formed at the center portion of the front wall 72 in the right-and-left direction. The width dimension of the window portion 78 in the right-and-left direction corresponds to the width dimension of the window portion 58 for the recording/reproducing head of the base plate portion 32, and it is formed continuously with the opening 54 of the base plate portion 32 (the window portion 58 for the recording/reproducing head) to constitute the opening 14 of the disk cartridge 10.

Furthermore, the left wall 74 and the right wall 76 have lateral grooves 74A, 76A constituting substantially front half parts of the first and second guide grooves 12A and 12B of the disk cartridge 10 respectively, and the rear end surfaces thereof abut against the front end surfaces of the left wall 46 and the right wall 48 of the base plate portion 32, respectively.

A lock release lever hole 80, through which the bottom portion of the lateral groove 74A intercommunicates with the inside of the left wall 74, is formed in the left wall 74. A support shaft 82 and a spring holding hole 84 are provided on the lower surface 64A of the flat plate portion 64 in the region of the lock release lever hole 80.

The inner portions of both the corner portions of the outer wall 70 are upwardly recessed to form abutting faces 86, which abut against the upper surface of the bottom plate portion 36 engagedly held at the inner peripheral portions of the inner portions.

Further, a peripheral wall 88 corresponding to the peripheral wall 42 of the base plate portion 32 is formed on the outer periphery at the rear side of the outer wall 70 of the flat plate portion 64 so as to project downwardly.

That is, the rear wall 90 of the peripheral wall 88 abuts against the rear wall 44 of the base plate portion 32 to constitute the rear end portion 10B of the disk cartridge 10, and the left wall 92 and the right wall 94 of the peripheral wall 88 abut against the left wall 46 and the right wall 48 of the base plate portion 32 respectively to constitute substantially the rear half parts of the first and second guide grooves 12A and 12B of the disk cartridge 10, respectively. Further, a slender groove 92A, which is formed in the left wall 92 so as to intercommunicate with the annular groove 68, confronts the slender groove 46A of the base plate portion 32 to thereby constitute a shutter guide groove 96.

A column-shaped positioning projection 98 having a screw hole 98A at the center thereof is formed between the peripheral wall 88 and the annular groove 68 in connection with each of the cylindrical projections 50 of the base plate portion 32. Each positioning projection 98 is designed so that a screw whose head is fitted in the screw supporting portion in each cylindrical projection 50 is screwed in the screw hole 98A while the lower end surface of the positioning projection 98 abuts against the upper end surface of the cylindrical projection 50 of the base plate portion 32, whereby the position of each position regulating hole 16 with respect to the top plate portion 34 is determined.

Thus, the top plate portion 34 and the base plate portion 32 are joined to each other to thereby form the case 30 in which the disk medium 20 is housed. In this state, the cylindrical wall 40 of the base plate portion 32 is inserted in the annular groove 68 of the top plate portion 34.

Further, the bottom plate portion 36 is disposed below the base plate portion 32. The bottom plate portion 36 is designed to have substantially the same flat outer shape as the flat plate portion 64 of the top plate portion 34, and the outer periphery thereof is slightly smaller than that of the flat portion 64.

An opening 100 having substantially the same shape as the opening 54 of the base plate portion 32 is formed in the bottom plate portion 36 so as to confront the opening 54. That is, the opening 100 intercommunicates with the opening 54 to constitute the opening 14 of the disk cartridge 10.

Further, the bottom plate portion 36 has through-holes 102 corresponding to the cylindrical projections 50 of the base plate portion 32. The bottom plate portion 36 is engagedly held by the peripheral wall 42 of the base portion 32 and the outer wall 70 of the top plate portion 34 in the state that the cylindrical projections 50 of the base plate portion 32 are inserted in the through-holes 102 and the upper surface of the bottom plate portion 36 abut against the lower surface 38B of the base plate portion 32 (the portion excluding the recess portion 38C) and the abutting faces 86 of the top plate portion 34.

The disk cartridge 10 has a shutter mechanism for opening/closing the opening 14 thereof. The shutter mechanism has the first shutter member 110.

The first shutter member 110 is formed to be substantially trapezoidal in plan view, and has a thin-plate type shutter main body 112 for mainly opening/closing the window portion 58 for the recording/reproducing head. The end face of the slant portion corresponding to the rear end of the shutter main body 112 (see FIGS. 2 to 4) serves as an abutting portion 114 against the second shutter member 150, and a press piece 116 for pressing the second shutter member 150 is formed at the left rear corner portion of the shutter main body 112 so as to be erected upwardly.

Further, an arcuate guide wall 118 is formed at the front end portion of the shutter main body 112 so as to be curved in conformity with the cylindrical wall 40 of the base plate portion 32 and upwardly erected. An extension portion 118A extending rightwardly from the arcuate guide wall portion 118 is provided with a window portion 118B corresponding to the window portion 78 of the top plate portion 34. The end portion of an extension portion 118C which extends leftward for a short distance from the arcuate guide wall portion 118 serves as a lock engaging portion 118D which is engageable with a lock pawl 138 as described later, and a shutter drawing portion 120 is connected to a slightly inner position of the end portion of the lock engaging portion 118D.

The shutter drawing portion 120 has a thickness sufficiently smaller than that of the arcuate guide wall portion 118 and is designed in the form of a plate so as to be elastically deformed in the thickness direction. The tip portion thereof is provided with a shutter engaging portion 122 which is designed as an operating portion in the form of a small block.

In the first shutter member 110 thus constructed, the shutter main body 112 is disposed between the recess portion 38C of the base plate portion 32 and the upper surface of the bottom plate portion 36 in the state that the arcuate guide wall portion 118 and the cylindrical wall 40 of the base plate portion 32 are inserted in the annular groove 68 of the top plate portion 34, the shutter drawing portion 120 is inserted in the shutter guide groove 96 and the shutter engaging portion 122 is disposed in the first guide groove 12A. In this state, the press piece 116 of the shutter main body 112 is inserted in the shutter guide hole 62 of the base plate portion 32, and located at the front side of the shutter guide hole 62. Accordingly, by moving the shutter engaging portion 122 in the first guide groove 12A backwardly from the outside, the arcuate guide wall 118 linked through the shutter drawing portion 120 to the shutter engaging portion 122 is slid along the outer peripheral surface of the cylindrical wall 40, and the shutter main body 112 is rotated (see FIGS. 4 to 7).

Dimensions of the respective parts are determined so that when the opening 14 is opened, the window portion 118B of the extension portion 118A is located at the front side and the cut-out portion of the front portion of the cylindrical wall 40 (the portion confronting the window portion 78 of the top plate portion 34) is opened.

The shutter mechanism has a lock means 130 for regulating the rotation of the first shutter member. The lock means 130 has a lock level 132 which is designed to have a V-shape in plan view. The lock lever 132 is freely rotatably mounted on the support shaft 82 of the top plate portion 34 by a cylindrical shaft 134 at the center portion thereof. One end portion thereof serves as a lock release lever 136 projecting from the lock release lever hole 80 into the first guide groove 12A (lateral groove 74A), and the other end thereof serves as a lock pawl 138 engageable with the lock engaging portion 118D of the first shutter member 110.

One end portion of a torsion spring 140 is inserted and held in the spring holding hole 84 of the top plate portion 34, and the other portion of the torsion spring 140 is fixed to the lock lever 132, whereby the lock pawl 138 is urged to be engaged with the lock engaging portion 118D of the first shutter member 110, whereby the first shutter member 110 is normally prevented from rotating and opening the opening 14.

On the other hand, when the lock release lever 136 is backwardly pressed, the lock lever 132 is rotated around the cylindrical shaft 134 against the urging force of the torsion spring 140, and the engagement between the lock pawl 138 and the lock engaging portion 118D of the first shutter member 110 is released.

The shutter mechanism is further equipped with the second shutter member 150 for mainly opening/closing the hub hole 56 of the base plate portion 32. The second shutter member 150 is formed of a thin plate having a trapezoidal shape in plan view.

The end face of the slant portion which is the front end of the second shutter member 150 serves as an abutting projection 152 which abuts against the abutting portion 114 of the first shutter member 110. A pressed piece 154 is upwardly erectly formed on the abutting portion 152 so as to be located at the position corresponding to the press piece 116 of the shutter main body 112. The width dimension of the pressed piece 154 is set so that the pressed piece 154 abuts against the press piece 116 in the rotating range of the shutter main body 112 (the moving range of the press piece 116 which is regulated by the shutter guide hole 62) at all times.

The second shutter member 150 has a upwardly erected rotating shaft 156 at the left rear end portion thereof. The rotating shaft 156 corresponds to the shutter shaft hole 52 of the base plate portion 32, and a slit 156A serving as a spring engaging portion is formed in the upper end portion of the rotating shaft 156.

The second shutter member 150 is disposed between the recess portion 38C of the base plate portion 32 and the upper surface of the bottom plate portion 36 under the state that the rotating shaft 156 is inserted in the shutter shaft hole 52 of the base plate portion 32 and the pressed piece 154 is inserted in the shutter guide hole 62. In this state, one end portion of a torsion spring 158 is fixed in the slit 156A of the rotating shaft 156, and the other end portion of the torsion spring 158 is fixed to the spring holding portion 53 of the base plate portion 32, whereby the second shutter member 150 is urged to abut against the first shutter member 110 at all times.

Accordingly, the second shutter member 150 is normally kept in a state such that the abutting portion 152 thereof abuts against the abutting portion 114 of the first shutter member 110, and in this state the second shutter member 150 closes the hub hole 56 of the base plate portion 32.

That is, the first shutter member 110 and the second shutter member 150 normally close the opening 14 of the disk cartridge 10 under the state that the abutting portions 114 and 152 thereof abut against each other as shown in FIG. 1B.

Construction of Write Protect Portion

As shown in FIGS. 8 to 12, the disk cartridge 10 is equipped with a write protect portion 160 for switching a write-allowed state (write-allowing mode) and a write-inhibited state (write-inhibiting mode) to each other.

The write protect portion 160 comprises an incident-light transmitting plate 162 for transmitting therethrough a laser beam emitted from a light emitting portion (not shown) of a drive device in which the disk cartridge 10 is loaded, a prism 164 which is housed in the case 30 and reflects the laser beam transmitted through the incident light transmitting plate 162, and an emission-light transmitting plate 168 for transmitting the laser beam reflected from the prism 164 to emit the laser beam to the outside of the case 30.

Each of the incident-light transmitting plate 162 and the emission-light transmitting plate 168 also serves as constituent parts of the case 30, so that invasion of dust from outside of the case into the case can be prevented.

The prism 164 is constructed by arranging two right-angled triangular prisms which are different in reflectivity, and the angles of both the ends of each triangular prism are set to 45 degrees. A prism 164H has a high reflection face 166H having high reflectivity, and the prism 164L has a low reflection face 166L having low reflectivity.

These two prisms 164H and 164L are mounted so as to be rotatable around the rotating shaft 170, and disposed axially symmetrically with respect to the rotating shaft 170. An engaging member 172 is secured to the rotating shaft 170, and the rotating shaft 170 is fitted to the notch portion of the engaging member 172 every time it is rotated by 180 degrees.

The drive device is equipped with a light emitting portion 174 for emitting a laser beam to the incident-light transmitting plate 162 and a photodetecting portion 176 for detecting a laser beam emitted from the emission-light transmitting plate 168. When the power of the laser beam detected by the photodetecting portion 176 is not less than 70% of that of the laser beam emitted from the light emitting portion 174, the drive device judges that the disk medium in the disk cartridge is under the write-allowed state. On the other hand, when the power of the laser beam is less than 70% of that of the laser beam emitted from the light emitting portion 174, the drive device judges that the disk medium is under the write-inhibited state.

Further, a gear 178 which rotates interlockingly with the rotating shaft 170 is equipped at the outside of the high reflection face 166H of the prism 164H and the low reflection face 166L of the prism 164L. In the case 30 are provided a disk-shaped tab 180 having a peripheral edge portion which is partially exposed from the side wall of the case 30, and a gear 182 fixed to the rotating shaft to which the tab 180 is fixed, the gear 182 being rotated interlockingly with the tab 180. The gear 178 and the gear 182 are engaged with each other.

In the above embodiment, the disk medium 20 is designed as a one-side recording type, and the opening 14 is formed at the lower portion (containing the front portion) of the disk cartridge. However, the above embodiment may be modified so that the disk medium 20 is designed as a double-side recording type, the openings 14 are formed at both the upper and lower portions respectively and the shutter members for opening/closing the upper and lower openings are disposed at the upper and lower sides of the disk medium 20. Further, the opening 14 is not limited to the construction that the hub hole 56 and the window portion 58 for the recording/reproducing head is formed continuously with each other, however, they may be formed separately from each other.

Description on Operation

Next, the operation of the present invention will be described.

Figure 4:
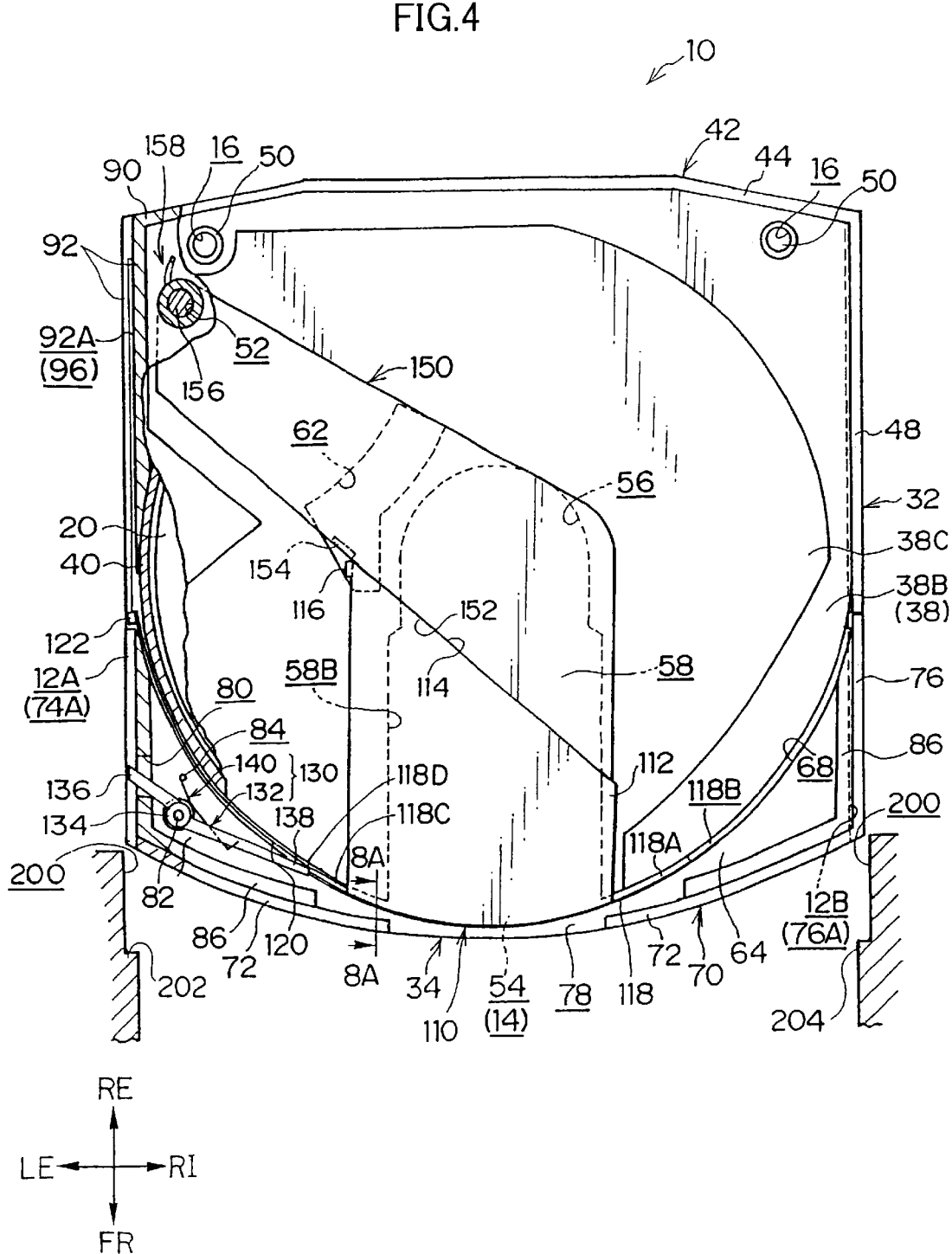
FIG. 4 is a partially-cut-away bottom view when a lower plate portion is detached, which shows the overall construction of an opening of the disk cartridge in a closed state according to the first embodiment of the present invention.

According to the disk cartridge 10 thus constructed, the opening 14 is closed by the first shutter member 110 and the second shutter member 150 when the disk medium 20 is unused. That is, as shown in FIG. 4, the abutting portion 114 of the first shutter member 110 and the abutting portion 152 of the second shutter member 150 abut against (come into contact with) each other, whereby the first shutter member 110 mainly closes the window portion 58 of the base plate portion 32 and the second shutter member 150 mainly closes the hub hole 56 of the base plate portion 32.

At this time, the rotation of the first shutter member 110 in the opening direction of the opening 14 is regulated through the engagement between the lock pawl 138 of the lock means 130 and the lock engaging portion 118D of the arcuate guide wall portion 118, thereby keeping the above closing state. Besides, the second shutter member 150 keeps its closing state by the urging force of the torsion spring 158.

Accordingly, invasion of dust into the disk cartridge 10 when the disk medium 20 is unused, that is, adhesion of dust to the lower surface 24 of the disk medium 20 can be prevented.

When the disk cartridge 10 is loaded into the drive device, it is inserted into an insertion port 200 (see FIGS. 4 to 7) of the drive device with the front end portion 10A thereof being put at the leading edge in the insertion direction.

Through this insertion, guide projecting portions 202, 204 of the drive device are inserted in the first guide groove 12A and the second guide groove 12B of the disk cartridge 10. Through further insertion of the disk cartridge 10, the guide projecting portion 202 inserted in the first guide groove 12A is relatively moved toward the back side of the first guide groove 12A and abuts against the lock release lever 136 to press the lock release lever 136 backward.

When the lock release lever 136 is backwardly pressed, the lock lever 132 is rotated around the cylindrical shaft 134 (support shaft 82) as shown in FIG. 5, so that the lock release lever 136 is retracted into the lock release lever hole 80 and the engagement between the lock pawl 138 and the lock engaging portion 118D is released. Accordingly, the lock state of the lock means 130 is released, and the first shutter member 110 is kept freely rotatable.

Figure 6:
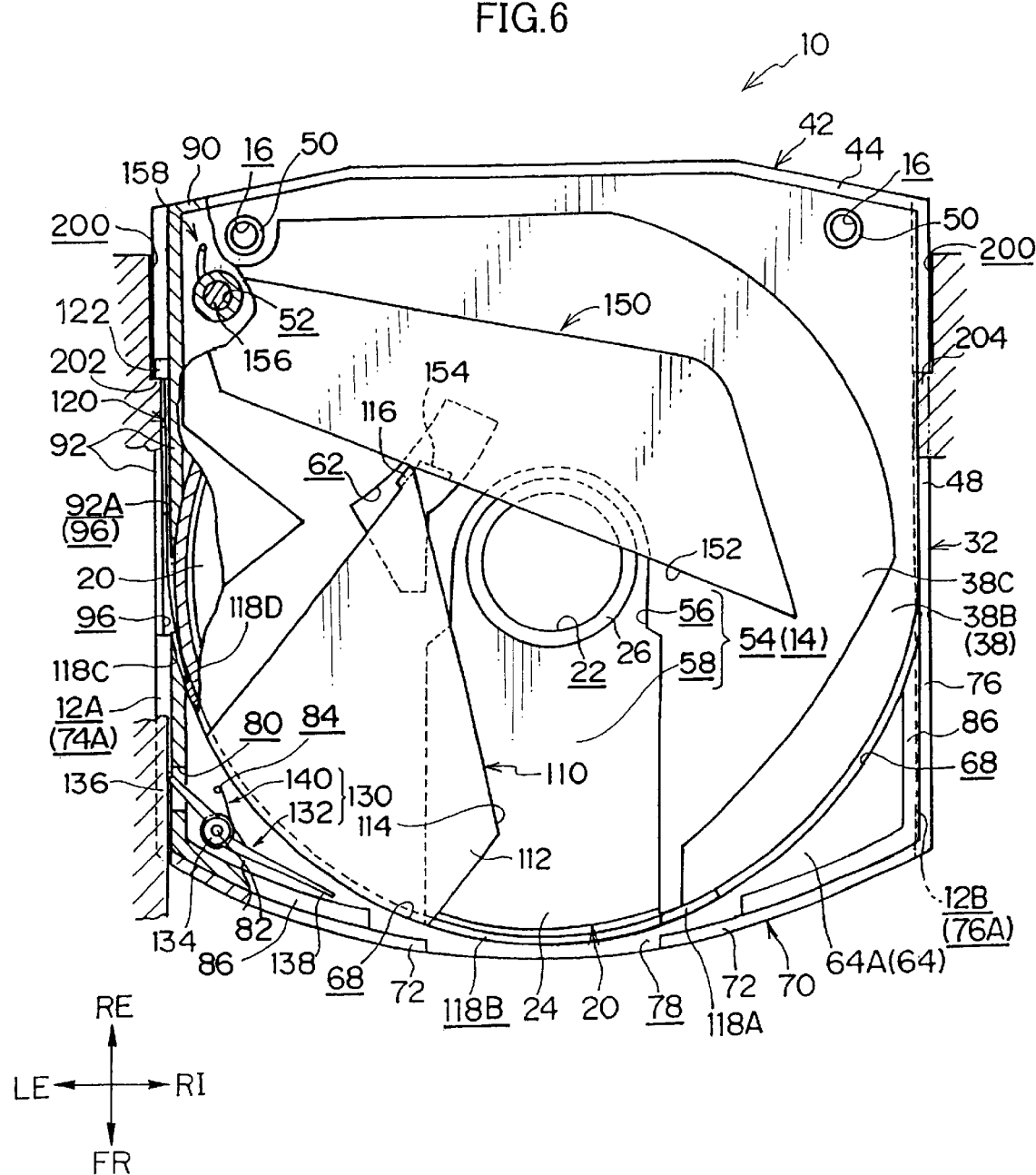
FIG. 6 is a partially-cut-away bottom view when a lower plate portion is detached, which shows an opening process for the opening of the disk cartridge according to the first embodiment of the present invention.

When the guide projecting portion 202 of the drive device is relatively moved further backward in the first guide groove 12A, the guide projecting portion 202 is engages with the shutter engaging portion 122 while keeping the lock release state, and presses the shutter engaging portion 122 backwardly. When the shutter engaging portion 122 is backwardly pressed, the first shutter member 110 whose lock state is released is rotated as shown in FIG. 6.

That is, following the backward movement of the shutter engaging portion 122, the arcuate guide wall portion 118 linked to the shutter engaging portion 122 through the shutter drawing portion 120 rotates while sliding along the outer peripheral surface of the cylindrical wall 40, thereby rotating the shutter main body 112.

Following the rotation of the first shutter member 110, the press piece 116 of the shutter main body 112 is moved substantially backwards in the shutter guide hole 62 (rotates around the axial center of the cylindrical shaft 40). When the press piece 116 is moved substantially backwards, the pressed piece 154 of the second shutter member 150, which is disposed to abut against the press piece 116, is moved along the arcuate portion of the shutter guide hole 62 while pressed substantially backwards, and the second shutter member 150 is rotated around the rotating shaft 156 against the urging force of the torsion spring 158 so as to be far away from the first shutter member 110.

Figure 7:
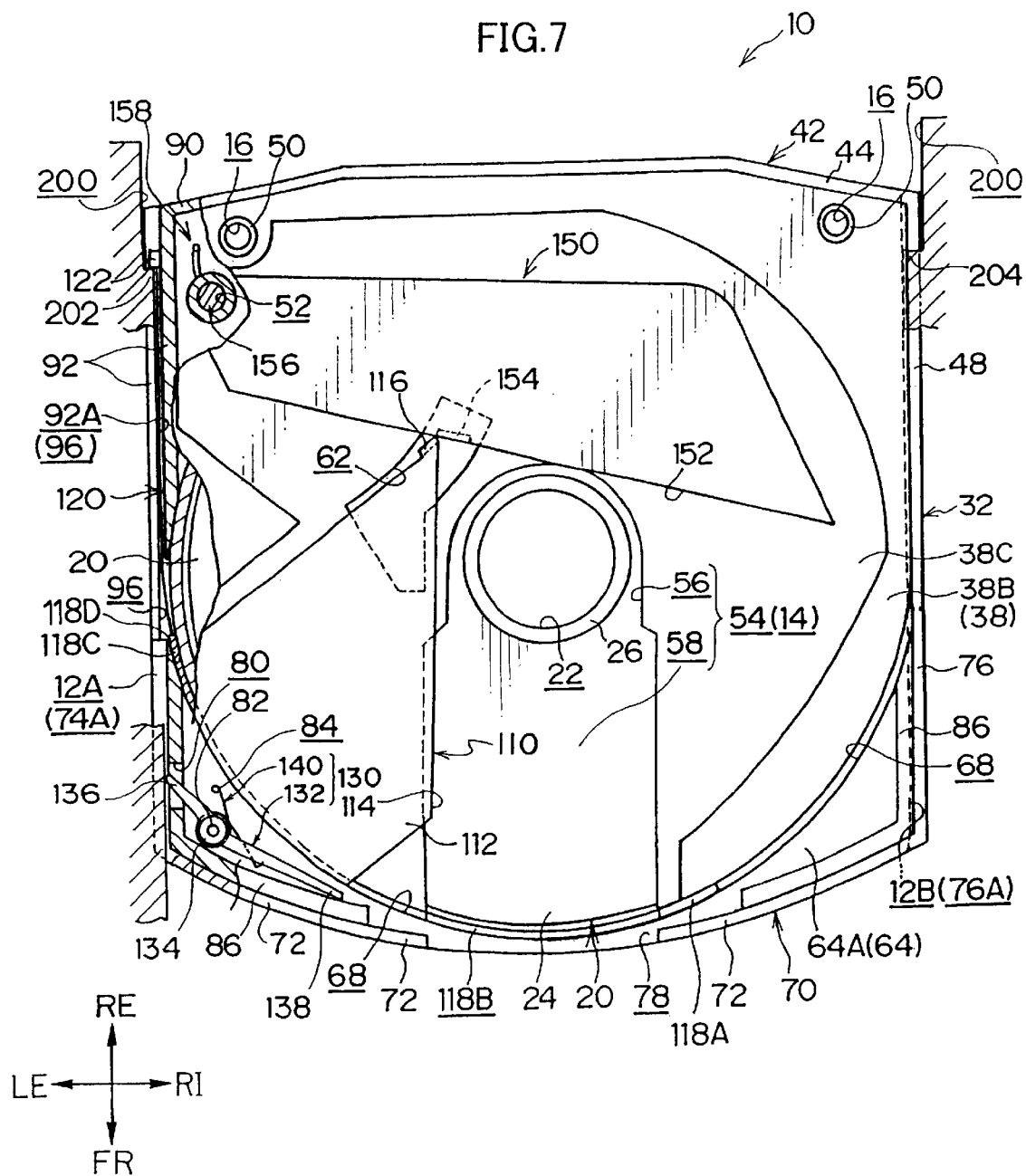
FIG. 7 is a partially-cut-away bottom view when a lower plate portion is detached, which shows the opening of the disk cartridge in an open state according to the first embodiment of the present invention.

When the guide projecting portion 202 of the drive device, which is engaged with the shutter engaging portion 122, is moved relatively further backwards in the first guide groove 12A, the first shutter member 110 and the second shutter member 150 are further rotated as shown in FIG. 7, so that the window 58 for the recording/reproducing head and the hub hole 56 are opened. In this state, the window portion 118B of the arcuate guide wall portion 118 is located at the front portion of the disk cartridge 10, and the front portion of the window 58 for the recording/reproducing head is also opened through the window portion 78 of the top plate portion 34. That is, the opening 14 of the disk cartridge 10 is opened.

When the disk cartridge 10 is inserted and located at a predetermined position of the drive device, the positioning mechanism of the drive device is inserted into the position regulating hole 16, whereby the disk cartridge 10 can be positioned with surety.

Under this state, the rotating spindle shaft is inserted from the portion corresponding to the hub hole 56 of the opening 14 for which the closing state is released. The rotating spindle shaft holds the center hole 22 of the disk medium 20 at the tip portion thereof by engagement, suction or the like, and rotates the disk medium 20 around the axial center. Further, the recording/reproducing head is inserted from the portion of the opening 14 which corresponds to the window portion 58 for the recording/reproducing head, and information is recorded in the recording face of the disk medium 20 or reproduced from the recording face.

On the other hand, when the disk cartridge 10 is unloaded from the drive device, the positioning mechanism is drawn out from the position regulating hole 16, and allowed to be moved to the unloading direction (toward the insertion port 200). In this state, the disk cartridge 10 is moved and the rear end portion 10B thereof is put at the leading edge in the unloading direction by the urging force of the torsion spring 158 or the pressing force in the unloading direction applied by the drive device, whereby the pressing force of the guide projecting portion 202 onto the shutter engaging portion 122 is lost, and the first shutter member 110 is allowed to be rotated.

In this state, the disk cartridge 10 closes the opening 14 while being moved in the unloading direction. That is, the second shutter member 150 is rotated in such a direction as to close the opening 14 while the press piece 116 of the first shutter member 110 is pressed substantially forward through the pressed piece 154 by the urging force of the torsion spring 158. Further, the first shutter member 110 which is pressed substantially forward through the press piece 116 is rotated in a direction so as to close the opening 14 by the pressing force.

When the first and second shutter members 110 and 150 are rotated and returned to their initial positions, the opening 14 is closed. The press piece 116 of the first shutter member 110 returned to the initial position is engaged with the inner edge of the front portion of the shutter guide hole 62, so that the second shutter member 150 is prevented from being further rotated by the urging force of the torsion spring 158.

Over-rotation of the first shutter member 110 and the second shutter member 150 over the initial positions thereof may be prevented by engaging the pressed piece 154 of the second shutter member 150 with the peripheral edge portion of the shutter guide hole 62 at the initial position, or by engaging the tip portion of the extension portion 118A of the arcuate guide portion 118 of the first shutter member 110 with the end portion of the broad portion of the annular groove 68 at the initial position. Further, the first shutter member 110 may be returned to the initial position by the pressing action of the drive device on the shutter engaging portion 122.

When the disk cartridge 10 is further moved in the unloading direction and the guide projecting portion 202 is moved to the front side of the lock release lever hole 80 of the first guide groove 12A, the lock lever 132 is rotated by the urging force of the torsion spring 140, the lock release lever 136 projects into the first guide groove 12A, and the lock pawl 138 is engaged with the lock engaging portion 118D of the first shutter member 110, whereby the disk cartridge 10 is returned to the state it was in before it was loaded in the drive device, and the rotation of the first shutter member 110 is prevented to keep the opening 14 in the closed state.

Figure 8:
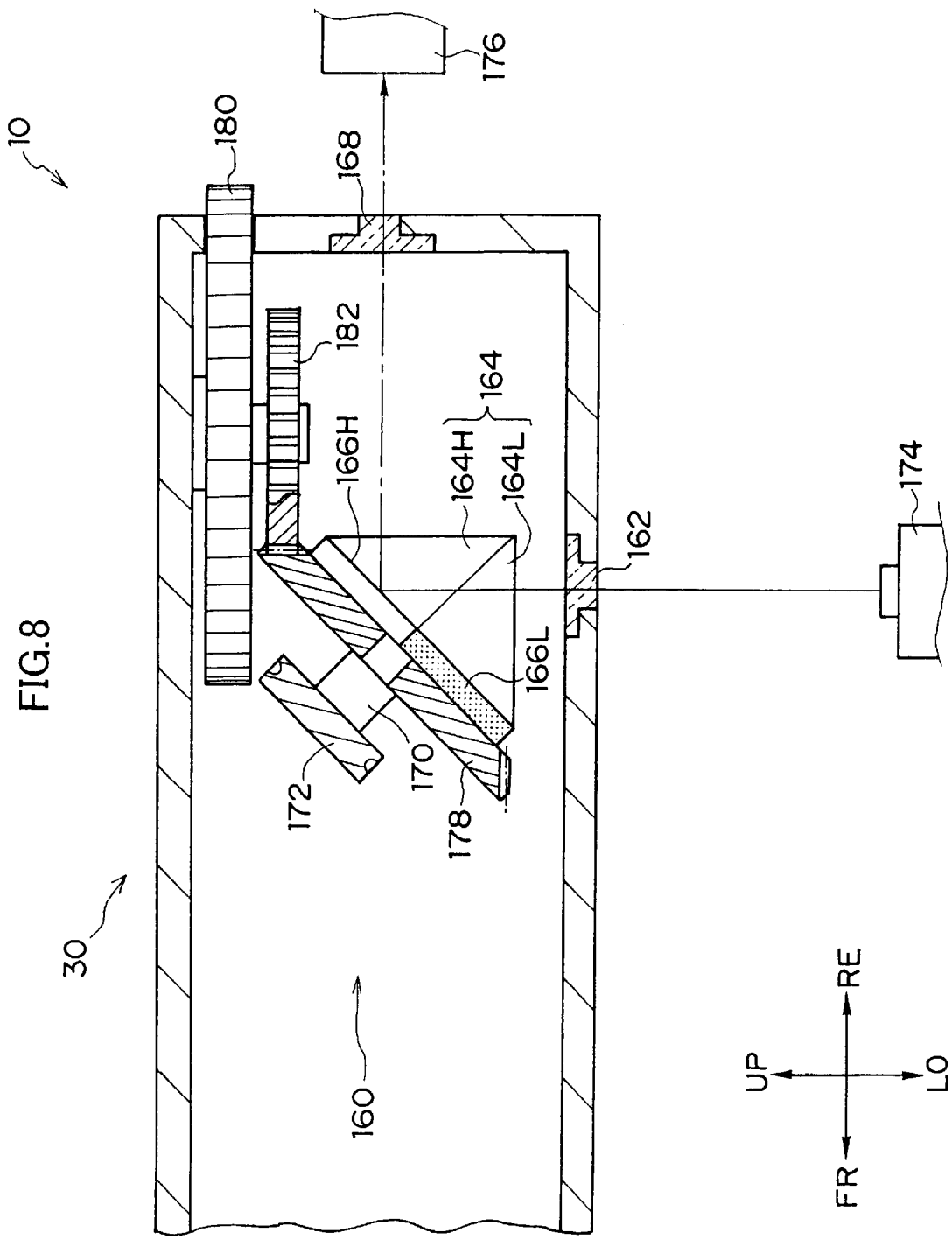
FIG. 8 is a side cross-sectional view showing a write protect portion of the disk cartridge according to the first embodiment of the present invention, in which the thickness of a reflection face is illustrated with emphasis in order to emphasize variation in reflectivity on the reflection face of a prism.

Further, as shown in FIG. 8, when the rotational position of the prism 164 is set to the write-allowed state under which data can be written into the disk medium 20 (i.e., the write-allowing mode position), a laser beam incident from the incident-light transmitting plate 162 is reflected from the high reflection face 166H of the prism 164H, transmitted through the emission-light transmitting plate 168 and then incident to the photodetecting portion 176 of the drive device. The power of the laser beam detected by the photodetecting portion 176 is not less than 70% of the power of the laser beam emitted from the light emitting portion 174, so that the drive device judges that the disk cartridge 10 is under the write-allowed state.

Figure 9:
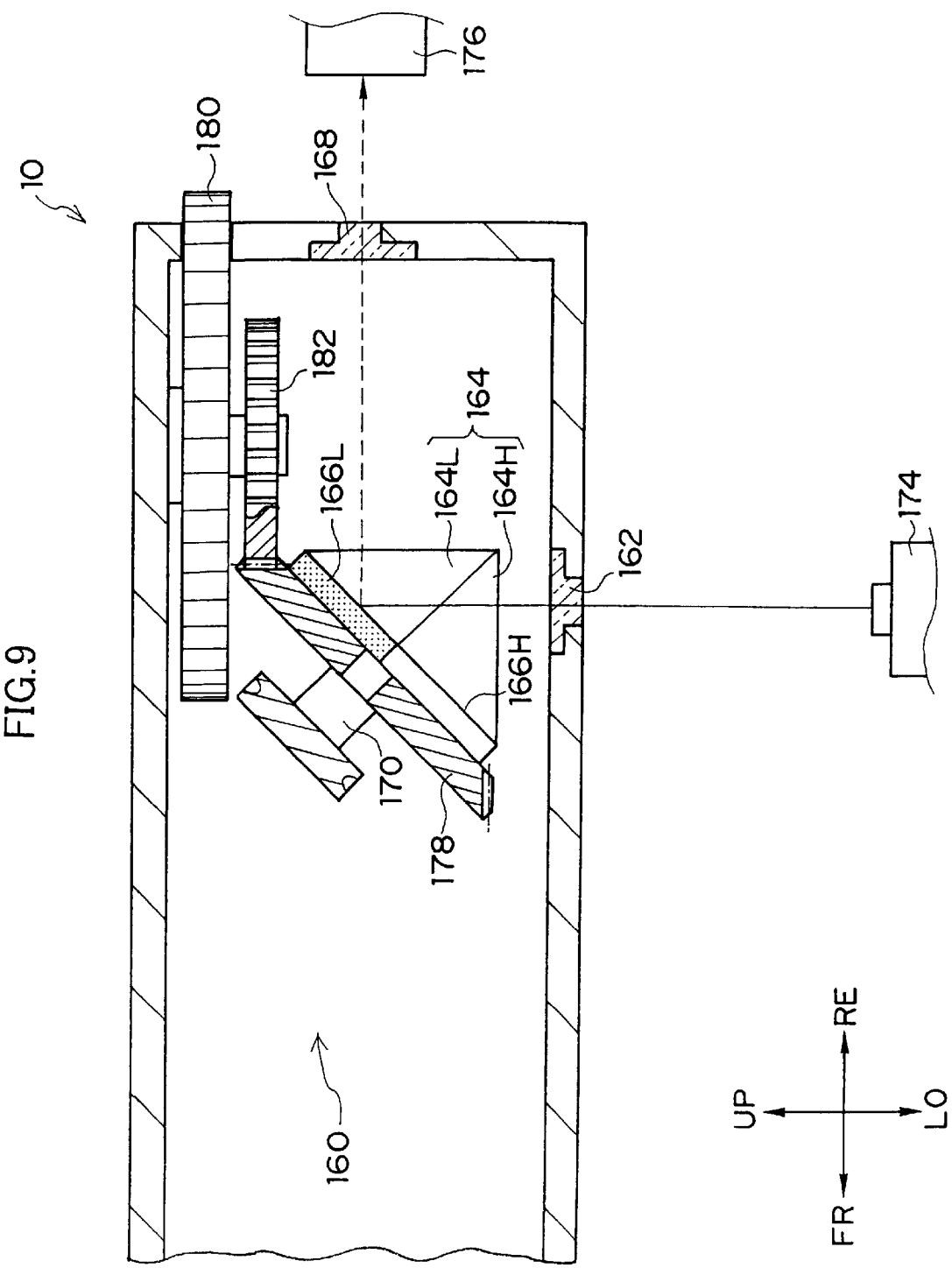
FIG. 9 is a side cross-sectional view showing the write protect portion of the disk cartridge according to the first embodiment of the present invention, in which the thickness of the reflection face is illustrated with emphasis in order to emphasize the difference of the reflectivity of the prism between two reflection faces.

When an operator rotates a tab 180 by his/her finger to rotate the prism 164 by 180 degrees as shown in FIG. 9, a laser beam incident from the incident-light transmitting plate 162 is reflected from the low reflection face 166L of the prism 164L, transmitted through the emission-light transmitting plate 168 and then incident to the photodetecting portion 176. The power of the laser beam detected by the photodetecting portion 176 is less than 70% of the power of the laser beam emitted from the light emitting portion 174, so that the drive device judges that the disk cartridge 10 is under the write-inhibited state.

In this embodiment, when the disk cartridge 10 is loaded in the drive device, there is not provided any site which abuts against the write protect portion 160. Accordingly, occurrence of dust due to the abutting can be prevented, misdetection due to deformation of the write protect portion 160 (that is, the write-allowed state/write-inhibited states being erroneously identified) can be also prevented.

Second Embodiment

Next, a second embodiment according to the present invention will be described.

Figure 10:
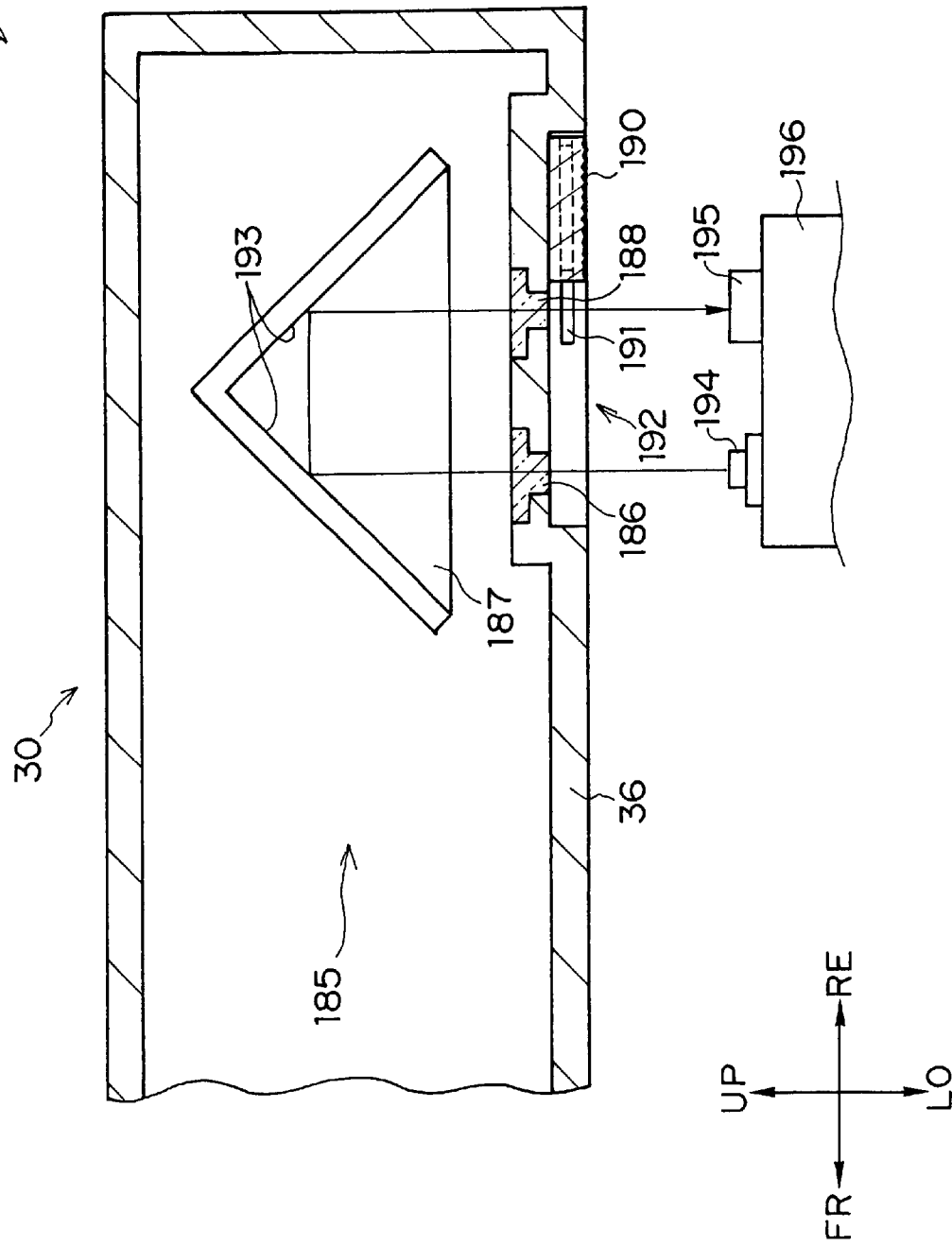
FIG. 10 is a side cross-sectional view showing a write protect portion of a disk cartridge according to a second embodiment of the present invention.

As shown in FIGS. 10 and 11, a disk cartridge 184 according to a second embodiment has a write protect portion 185 which is different from that of the first embodiment in construction and operation, the basic construction and operation except for the write protection portion is the same as the first embodiment. In the second embodiment, the same constituent elements as the first embodiment are represented by the same reference numerals, and the description thereof is omitted.

Construction of Write Protect Portion

The write protect portion 185 of the disk cartridge 184 is equipped with a incident-light transmitting plate 186 for transmitting a laser beam emitted from the light emitting portion (not shown) of the drive device in which the disk cartridge is loaded, a prism 187 which is housed in the case 30 and reflects the laser beam transmitted through the incident-light transmitting plat 186, and an emission-light transmitting plate 188 for emitting the laser beam reflected from the prism 187 to the outside of the case 30.

The incident-light transmitting plate 186 and the emission-light transmitting plate 188 are disposed at the lower surface side of the bottom plate portion 36 constituting the case 30 so as to be proximate to each other. Each of the incident-light transmitting plate 186 and the emission-light transmitting plate 188 serves as a constituent member of the case 30, and thus invasion of dust from the outside of the case into the case can be prevented as in the case of the first embodiment.

Further, a plate piece 190 and a holding groove 191 is formed at the lower surface side of the bottom plate portion 36 to perform the switching operation between interception and non-interception of the emission-light transmitting plate 188, and a recess portion 192 is formed so as to hold the plate piece 190 so that the plate piece 190 is slidable along the lower surface of the case.

The prism 187 has a right-angled prism having both the ends of 45 degrees, and the oblique surface of the prism 187 is put face down, that is, oriented to the incident-light transmitting plate 186 and the emission-light transmitting plate 188. A reflection face 193 formed on the prism 187 comprises a high reflection face having high reflectivity.

The drive device is equipped with a light emitting portion 194 for emitting a laser beam to the incident-light transmitting plate 186 and a photodetecting portion 195 for detecting a laser beam emitted from the emission-light transmitting plate 188 which are juxtaposed with each other. When the power of the laser beam detected by the photodetecting portion 195 is not less than 70% of that of the laser beam emitted from the light emitting portion 194, the drive device judges that the disk cartridge 184 is in the write-allowed state. On the other hand, when the power of the former laser beam is less than 70% of that of the latter laser beam, the drive device judges that the disk cartridge is in the write-inhibited state.

Operation of Write Protect Portion

When the plate piece 190 is located at the non-interception position with respect to the emission-light transmitting plate 188 as shown in FIG. 10, the laser beam incident from the incident-light transmitting plate 186 is reflected from the reflection face 193 of the prism 187, transmitted through the emission-light transmitting plate 188 and then incident on the photodetecting portion 195 of the drive device. The power of the laser beam detected by the photodetecting portion 195 is not less than 70% of the power of the laser beam emitted from the light emitting portion 194, so that the drive device judges that the disk cartridge 184 is in the write-allowed state.

When an operator slides the plate piece 190 by his/her finger to move the plate piece 190 to the interception position with respect to the emission-light transmitting plate 188 as shown in FIG. 11, the laser beam emitted from the light emitting portion 194 is intercepted by the plate piece 190, and thus no laser beam reaches the photodetecting portion 195. Therefore, the drive device judges that the disk cartridge 184 is in the write-inhibited state.

In the above embodiment, there any abutting rod which abuts against the write protect portion 185 when the disk cartridge 184 is loaded in the drive device is not provided, so that occurrence of dust due to the abutting can be prevented, and deformation of the write protect portion 185 can be also prevented as in the case of the first embodiment.

Further, the incident-light transmitting plate 186 and the emission-light transmitting plate 188 are juxtaposed with each other, so that the inlet and the outlet for the laser beams can be collectively disposed at one place.

Still further, the light emitting portion 194 and the photodetecting portion 195 are juxtaposed with each other, so that they can be fabricated as a single light emitting/detecting device 196.

Third Embodiment

Next, a third embodiment according to the present invention will be described.

As shown in FIGS. 12 and 13, a disk cartridge 230 according to the third embodiment has a write protect portion 232, which is different in construction and operation from the write protect portion of the first embodiment, and the other basic construction and operation are the same as the first embodiment. In the third embodiment, the same constituent elements as the first embodiment are represented by the same reference numerals.

Construction of Write Protect Portion

The write protect portion 232 of the disk cartridge 230 comprises an incident-light transmitting plate 162 for transmitting a laser beam emitted from the light emitting portion (not shown) of the drive device in which the disk cartridge 230 is loaded, a prism 236 for reflecting the laser beam transmitted through the incident-light transmitting plate 162, and an emission-light transmitting plate 168 for emitting the laser beam reflected from the prism 236 to the outside of the case 30. Each of the incident-light transmitting plate 162 and the emission-light transmitting plate 168 is a constituent member of the case 30, and thus invasion of dust from the outside of the case into the case can be prevented as in the first embodiment.

The case 30 is equipped with a sliding member 240 which slides along the bottom plate portion 36 while holding the prism 236. A through hole 242 having a slender shape is formed along the sliding direction in the bottom plate portion 36 so that an operation can slid the sliding member 240 by his/her finger, and a finger-force receiving plate portion 240F of the sliding member 240 is exposed to the lower side of the bottom plate portion 36.

The prism 236 is a right-angled prism having angles at both the ends of 45 degrees, and a reflection face 238 is formed on the oblique face of the prism 236. The reflection face 238 comprises a high reflection face having high reflectivity.

The drive device is equipped with a light emitting portion 174 for emitting a laser beam emitted from the incident-light transmitting plate 162, and a photodetecting portion 176 for detecting the laser beam emitted from the emission-light transmitting plate 168. When the power of the laser beam detected by the photodetecting portion 176 is not less than 70% of the laser beam emitted from the light emitting portion 174, the drive device judges that the disk cartridge 230 is in the write-allowed state. On the other hand, when it is less than 70% of the power of the laser beam emitted from the light emitting portion 174, the drive device judges that the disk cartridge 230 is in the write-inhibited state.

Operation of Write Protect Portion

As shown in FIG. 12, when the prism 236 is located at the write-allowing position at which data can be written into the recording medium 20, the laser beam emitted from the incident-light transmitting plate 162 is reflected from the reflection face 238 of the prism 236, transmitted through the emission-light transmitting plate 168 and then incident on the photodetecting portion 176 of the drive device. The power of the laser beam detected by the photodetecting portion 176 is not less than 70% of that of the laser beam emitted from the light emitting portion 174, so that the drive device judges that the disk cartridge 230 is in the write-allowed state.

When the operator applies his/her finger force to the finger-force receiving portion 240F to slide the sliding member 240 as shown in FIG. 13, the reflection position of the laser beam on the reflection face 238 is shifted, so that the laser beam is intercepted by a rear wall 44 of the case 30 and does not reach the photodetecting portion 176, whereby the drive device judges that the disk cartridge 230 is in the write-inhibited state.

In this embodiment, as in the case of the second embodiment, there is not provided any abutting rod which abuts against the write protect portion 232 when the disk cartridge 230 is loaded in the drive device, so that occurrence of dust due to the abutting can be prevented and deformation of the write protect portion 232 can be prevented.

Fourth Embodiment

Next, a fourth embodiment according to the present invention will be described.

As shown in FIGS. 14 and 15, a disk cartridge 250 according to the fourth embodiment has a write protect portion 252 which is different from the first embodiment in construction and operation, and the other basic construction and operation are the same as the first embodiment.

Construction of Write Protect Portion

A plate piece 256 for reflecting the laser beam emitted from the light emitting portion 174 of the drive device in which the disk cartridge 250 is loaded is equipped to the write protect portion 252 of the disk cartridge 250 so as to be slidable along a recess portion 258 formed on the lower surface of the case of the disk cartridge 250.

The outer surface of the plate piece 256 comprises a white portion 256W having high reflectivity and a black portion 256B having low reflectivity.

The drive device is equipped with a light emitting portion 174 for emitting a laser beam toward the incident-light transmitting plate 162, and a photodetecting portion 176 for detecting the laser beam emitted from the light-emission transmitting plate 168. When the power of the laser beam detected by the photodetecting portion 176 is not less than 70% of the power of the laser beam emitted from the light emitting portion 174, the drive device judges that the disk cartridge 250 is under the write-allowed state. On the other hand, if it is less than 70%, the drive device judges that the disk cartridge 250 is in the write-inhibited state.

Operation of Write Protect Portion

When the plate piece 256 is located at the write-allowing position where data can be written in the disk medium 20 as shown in FIG. 14, the laser beam emitted from the light emitting portion 174 is reflected from the white portion 256W. As a result, the power of the laser beam detected by the photodetecting portion 176 is not less than 70% of the power of the laser beam emitted from the light emitting portion 174, so that the drive device judges that the disk cartridge 250 is in the write-allowed state.

When the operator applies moving force to the plate piece 256 by his/her finger to slide the plate piece 256 to the write-inhibiting position as shown in FIG. 15, the power of the laser beam emitted from the photodetecting portion 176 is less than 70% of the power of the laser beam emitted from the light emitting portion 174, so that the drive device judges that the disk cartridge 250 is in the write-inhibited state.

According to this embodiment, the same effect as the first to third embodiments can be achieved although the construction of the write protect portion 252 is simple.

In the above-described four embodiments, the judgement as to whether the write protect state is in the write-allowed state or the write-inhibited state is made on the basis of the judgment as to whether the photodetecting portion of the drive device detects the laser beam whose power is not less than 70% or is less than 70%. However, the numerical value (threshold value: 70%) is merely an example value, and other numerical values may be set as the threshold value.

Fifth Embodiment

Next, a fifth embodiment according to the present invention will be described.

First, the overall construction of the disk cartridge 310 according to the fifth embodiment will be described, and next a capacity indicating portion which is the main part of this embodiment and a disk drive device 390 according to this embodiment will be described in detail.

Overall Construction of Disk Cartridge

Figure 16A:
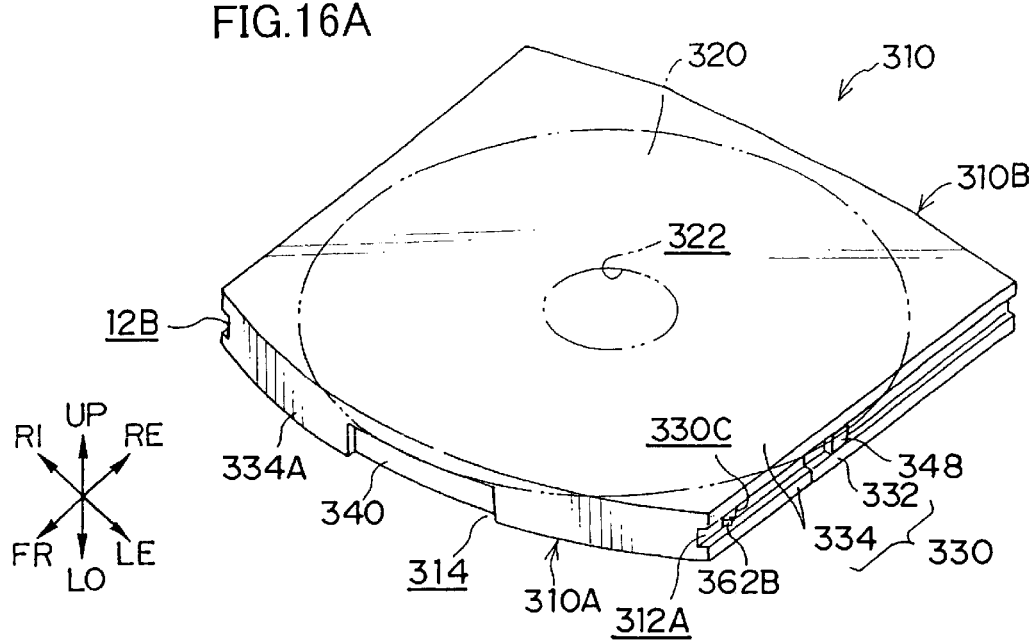
FIG. 16A is a perspective view of the appearance of a disk cartridge according to a fifth embodiment of the present invention, which disk cartridge is viewed from an upper front side.
Figure 16B:
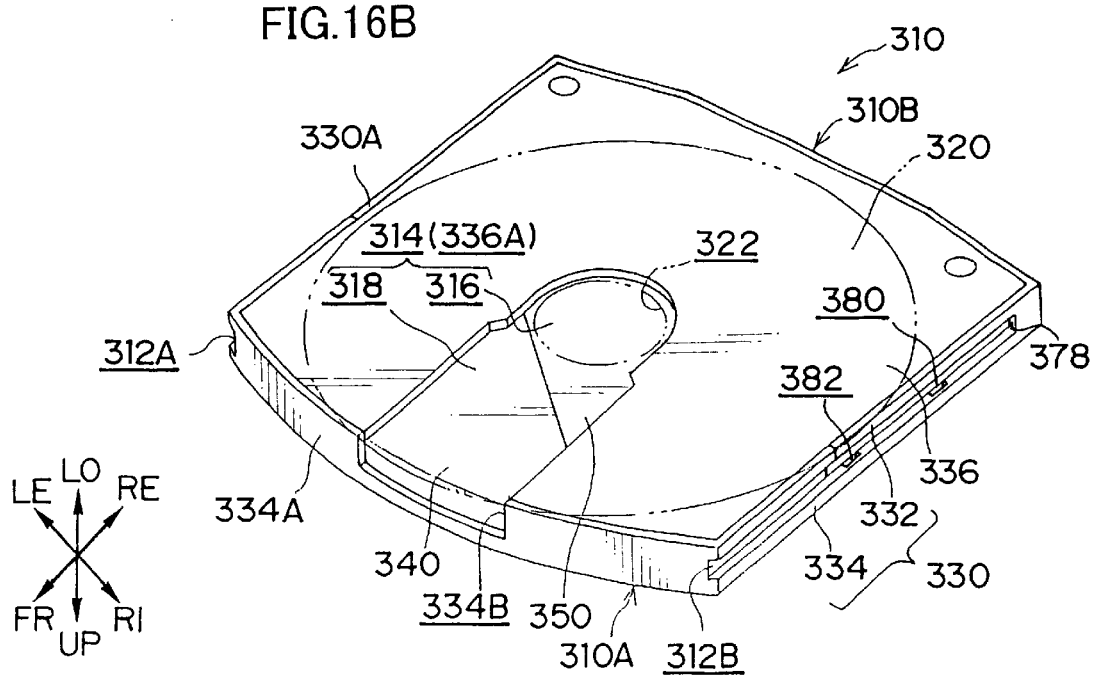
FIG. 16B is a perspective view of the appearance of the disk cartridge of the fifth embodiment, which disk cartridge is viewed from a lower front side.

FIG. 16A is a perspective view showing the appearance of a disk cartridge 310 which is viewed from an obliquely upper side, and FIG. 16B is a perspective view showing the appearance of the disk cartridge 310 which is viewed from an obliquely lower side.

As shown in FIGS. 16A and 16B, the disk cartridge 310 is designed to be flat so that the front end portion 310A and the rear end portion 310B thereof respectively have, in plan view, an arcuately-curved shape and a substantially-polygonal shape with the right and left corners thereof being cut out in accordance with functions required, and the width dimensions of the front portion and the rear portion thereof are slightly larger than the width dimensions of the right and left side portions. This structure of the disk cartridge 310 makes it easy to visually recognize the loading direction of the disk cartridge 310 into a drive device (not shown) from its appearance, and inhibits the disk cartridge 310 from being loaded into the drive device from an incorrect direction.

Further, a first guide groove 312A and a second guide groove 312B for guiding the disk cartridge 310 when the disk cartridge 310 is loaded into the drive device are formed on the right and left side surfaces of the disk cartridge 310.

A disk-shaped medium (disk medium) 320 as a recording/reproducing medium is rotatably housed in the disk cartridge 310. The disk medium 320 housed in the cartridge 20 has a center hole 322 at the center portion thereof, and it is supported by a rotating spindle shaft of the drive device at the center hole 322. In addition, a recording face (not shown) formed on the lower surface 324 of the disk medium 320 is covered by a cover layer (not shown).

Further, an opening 314 is formed in the disk cartridge 310 so as to extend from the center portion of the lower surface of the disk cartridge 310 to the center portion of the front wall of the front end portion 310A, and it is used for an access to the disk medium 320. The opening 314 has a substantially circular hub hole 316 into which a spindle shaft (described later) of the disk drive device is inserted to approach to the center hole 322 of the disk medium 320, and a substantially rectangular window portion 318 for a recording/reproducing head (not shown) into which the recording/reproducing head of the disk drive device is inserted to approach to the recording face of the disk medium 320, the hub hole 316 and the window portion 318 being formed to be continuous with each other.

The opening 314 is opened/closed by a first shutter member 340 and a second shutter member 350, which are described later.

The disk cartridge 310 has a case 330 having the first guide groove 312A and the second guide groove 312B formed therein. The case 330 is fabricated by joining a base plate portion 332 serving as a lower shell and a top plate portion 334 serving as an upper shell. The lower portion of the case 330 is covered by a bottom plate portion 336 serving as a cover member, which is fitted to and held by the peripheral wall 330A of the lower portion of the case 330.

Figure 19:
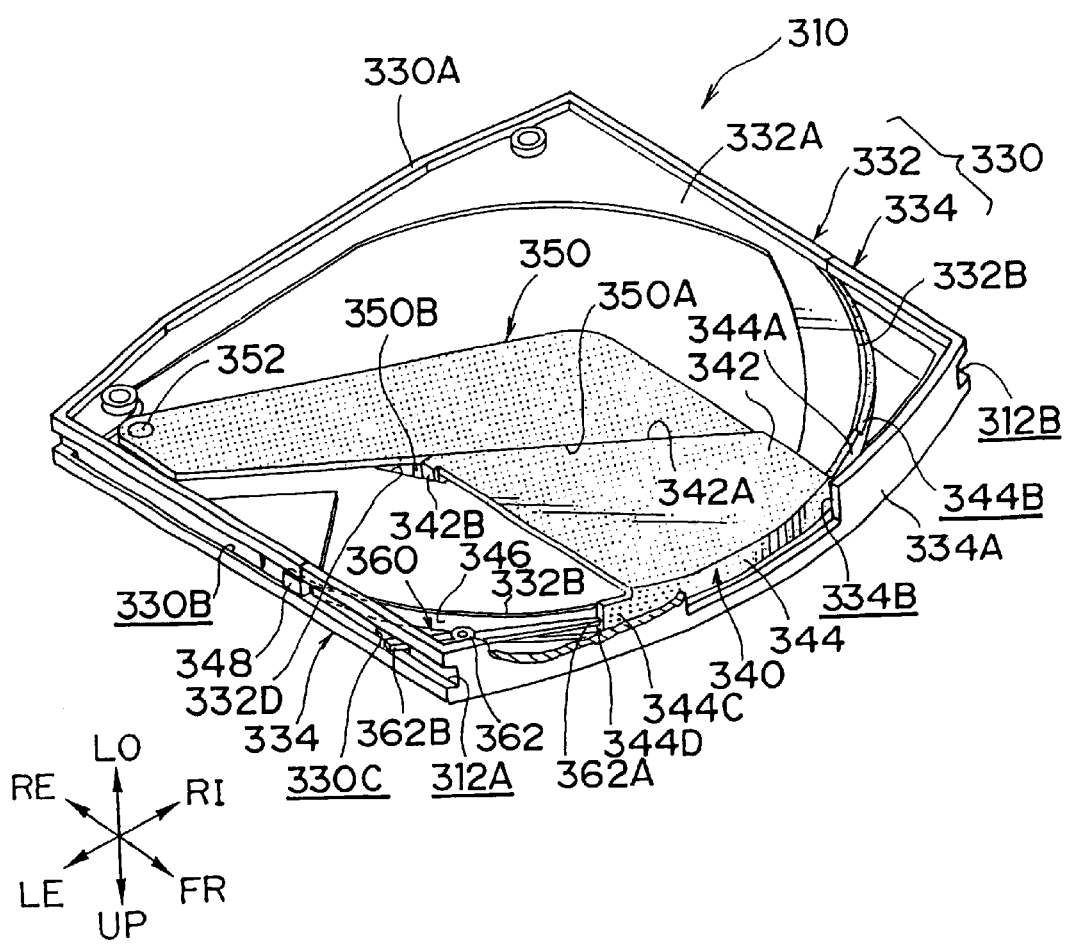
FIG. 19 is a perspective view showing the internal construction of the disk cartridge according to the fifth embodiment of the present invention when the opening is in the closed state.
Figure 24:
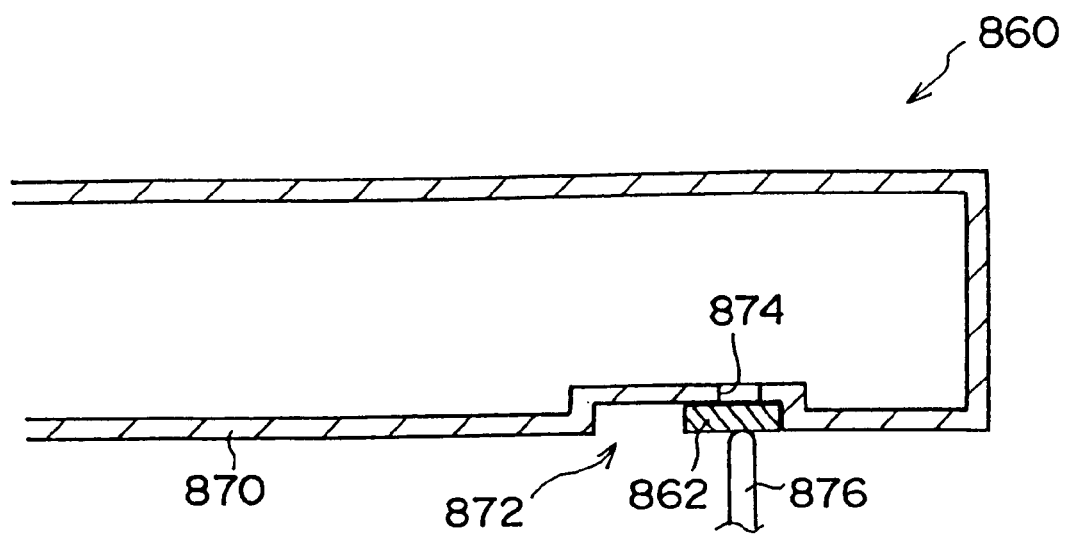
FIG. 24 is a side cross-sectional view showing a write protect portion of a conventional disk cartridge.
Figure 25:
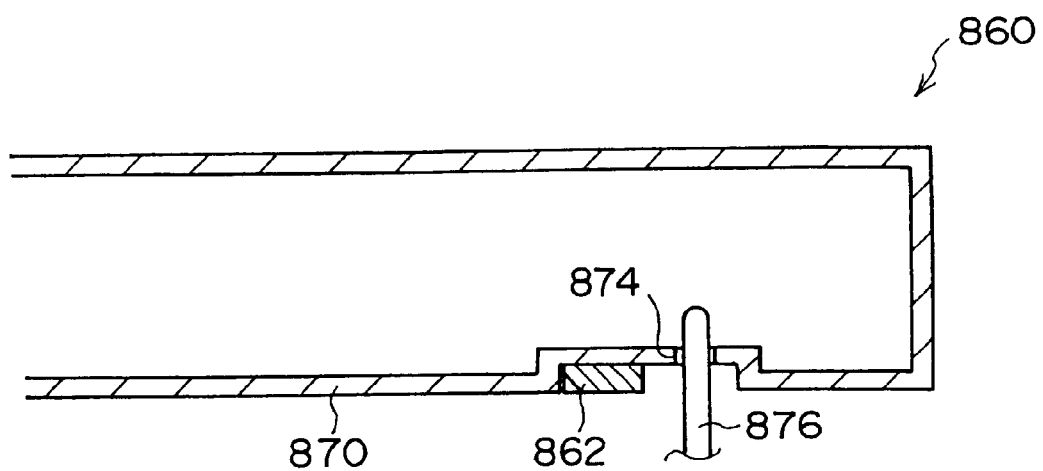
FIG. 25 is a side cross-sectional view showing the write protect portion of the conventional disk cartridge.

As shown in FIGS. 19 and 20, in which the bottom plate portion 336 is removed, the base plate portion 332 has a substantially cylindrical wall 332B surrounding the bottom portion 332A of the base plate portion 332, and the disk medium 320 is rotatably housed between the cylindrical wall 332B and the top plate portion 334.

An opening 332C corresponding to the opening 314 is formed in the base plate portion 332 so as to extend from the bottom portion 332A to the cylindrical wall 332B. An opening 334B corresponding to the forward-facing portion of the opening 314 is formed in the front wall 334A constituting the front end portion 310A of the top plate portion 334. Further, an opening 336A corresponding to the downward-facing portion of the opening 314 is formed in the bottom plate portion 336 (see FIG. 16B). That is, the opening 314 is formed by the intercommunication of the openings 332C, 334B and 336A.

The first shutter member 340 and the second shutter member 350 are disposed between the case 330 and the bottom plate portion 336.

The first shutter member 340 has a shutter main body 342 formed of a thin plate. The shutter main body 342 is designed to have a substantially trapezoidal shape, and mainly opens/closes the window portion 318 for the recording/reproducing head. The shutter main body 342 has a slant portion at the rear portion thereof, and a press portion 342B for pressing the second shutter member 350 at the left rear corner portion thereof. The slant portion of the shutter main body 342 serves as an abutting portion 342A which abuts against the second shutter member 350.

An arcuate guide wall portion 344 which is curved in conformity with the cylindrical wall 332B of the base plate portion 332 is formed at the front end portion of the shutter main body 342. The arcuate guide wall portion 344 is slidable with the outer peripheral portion of the cylindrical wall 332B, and a window portion 344B corresponding to the opening 334B of the top plate portion 334 is provided to an extension portion 344A extending rightward. Further, an extension portion 344C extending leftward from the arcuate guide wall portion 344 for a short distance serves as a lock engaging portion 344D whose end portion is engaged with a lock pawl 362A described later, and a shutter drawing portion 346 is connected to a slightly inner position of the end portion of the lock engaging portion 344D.

The shutter drawing portion 346 comprises an elastic plate having a sufficiently smaller thickness than the arcuate guide wall portion 344, and the tip portion thereof is passed through a slit portion (not shown) and projects into the first guide groove 312A. The shutter drawing portion 346 is guided forward and backward by a guide groove 330B comprising a pair of slender grooves which are disposed in the region of the bottom portion of the first guide groove 312A so as to face each other in the vertical direction.

A shutter engaging portion 348 like a small block is provided as an operating portion to the tip portion of the shutter drawing portion 346, and disposed so as to be slidable in the first guide groove 312A. The shutter engaging portion 348 is designed so that the shutter drawing portion 346 is prevented from falling off from the first guide groove 312A when it is guided by the guide groove 330B.

According to this construction, when the shutter engaging portion 348 is moved backward along the first guide groove 312A, the arcuate guide wall portion 344 is slid along the cylindrical wall 332B and the shutter main body 342 is rotated.

The second shutter member 350 is designed to have a substantially trapezoidal shape, which is longer in the right-and-left direction, and mainly opens and closes the hub hole 316. The second shutter member 350 has a slant portion at the front portion thereof, and is equipped with a pressed portion 350B located at the position corresponding to the press portion 344B of the first shutter member 340. The slant portion of the second shutter member 350 serves as an abutting portion 350A, which abuts against the abutting portion 342A of the first shutter member 340. The press portion 344B and the pressed portion 350B are disposed in a shutter guide hole 332D formed in the base plate portion 332, and the moving ranges thereof are regulated.

The second shutter member 350 is equipped with a rotating shaft 352 in the region of the left end portion thereof so that the rotating shaft 352 is rotatably supported by the base plate portion 332, and the second shutter member 350 is urged by a torsion spring (not shown) so as to close the opening 314.

The first shutter member 340 and the second shutter member 350 close the opening 314 with no gap when the abutting portions 342A and 350A abut against each other substantially over the whole bodies thereof, that is, when the first shutter member 340 and the second shutter member 350 are brought into contact with each other. Further, when the first shutter member 340 (shutter main body 342) is rotated, the press portion 342B presses the pressed portion 350B of the second shutter member 350 to rotate the second shutter member 350 around the rotating shaft 352 against the urging force of the torsion spring. That is, the first shutter member 340 and the second shutter member 350 are interlocked with each other to open the opening 314.

The disk cartridge 310 is equipped with lock means 360 disposed at the left front corner portion thereof. The lock means 360 is equipped with a lock lever 362 which is swingably supported around a shaft on the top plate portion 334. The lock lever 362 is designed in a substantially "V-shape" in plan view. One end of the lock lever 362 serves as a lock pawl 362A which is engageable with a lock engaging portion 344D of the first shutter member, and the other end portion thereof serves as a lock release portion 362B which passes through the lever hole 330C of the case 330 and projects into the first guide groove 312A. The lock release portion 362B is located at the front side of the shutter engaging portion 348 of the first shutter member 340 in the first guide groove 312A.

The lock lever 362 is urged by a torsion spring (not shown) so that the lock pawl 362A is engaged with the lock engaging portion 344D, and it is rotated against the urging force of the torsion spring by pressing the lock release portion 362B backwards, thereby releasing the lock state.

Construction of Capacity Indicating Portion

An example of the capacity indicating portion of the disk cartridge 310 according to this embodiment when three kinds of recording capacities (small capacity, middle capacity and large capacity) are provided as the storage capacity of the disk medium 320 according to this embodiment will be described.

Figure 17:
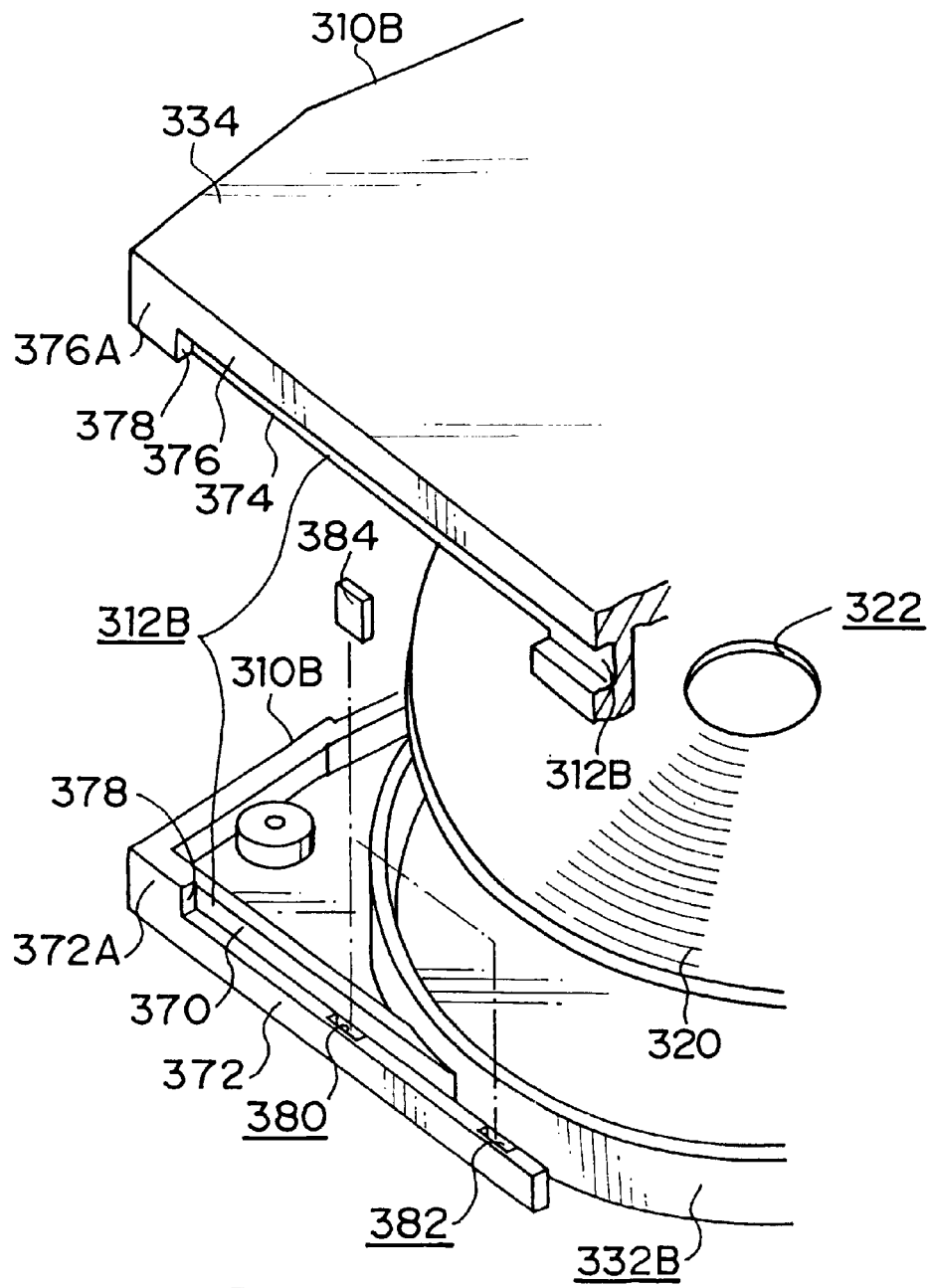
FIG. 17 is an exploded perspective view showing the enlarged right rear portion of a case constituting the disk cartridge according to the fifth embodiment of the present invention.

FIG. 17 is an exploded perspective view containing an enlarged view of a substantially rear half portion of the second guide groove 312B formed along the forward and backward direction of the case 330 (the loading direction to disk drive devices 390 and 400, which are described later).

As shown in FIG. 17, the substantially rear half portion of the second guide groove 312B is formed by joining the base plate portion 332 and the top plate portion 334. Specifically, the right wall of the base plate portion 332 is constructed by an inner wall 370 and an outer wall 372 having the upper end surface lower than the inner wall 370 in height, and the right wall of the rear portion of the top plate portion 334 comprises an inner wall 374 and an outer wall 376 having the lower end surface higher than the inner wall 374 in height. The base plate portion 332 and the top plate portion 334 are joined to each other when the upper end surface of the inner wall 370 and the lower end surface of the inner wall 374 abut against each other, thereby forming the substantially rear portion of the second guide groove 312B. The substantially front half portion of the second guide groove 312B is formed integrally with the top plate portion 334.

That is, the outer surfaces (right surfaces) of the inner walls 370, 374 constitute the bottom portion of the second guide groove 312B, and the upper surface of the outer wall 372 and the lower surface of the outer wall 376 constitute a lower wall portion and an upper wall portion of the second guide groove 312B, respectively.

Sealing portions 372A, 376A are formed at the rear end portions of the outer walls 372, 376 respectively so as to be located at the same height as the inner walls 370, 374 respectively, and the front end surface of the portion at which the upper end surface of the sealing portion 372A and the lower end surface of the sealing portion 376A are brought into contact with each other constitutes a capacity indicating portion (small-capacity indicating portion 378). That is, the small-capacity indicating portion 378 is formed integrally with the case 330 at the rear end portion of the second guide groove 312B (the case 330).

Further, a middle-capacity fixing hole 380 and a large-capacity fixing hole 382, serving as an upwardly-opened fixing portion, are formed in the upper surface of the outer wall 372 of the base plate portion 332 (the lower wall portion of the second guide groove 312B). A capacity indicating block 384 serving as a capacity indicating portion is detachably engagedly fitted in each of the middle-capacity fixing hole 380 and the large-capacity fixing hole 382.

The capacity indicating block 384 seals (fills or closes) the second guide groove 312B when the capacity indicating block 384 is secured to the middle-capacity fixing hole 380 or the large-capacity fixing hole 382, whereby the capacity indicating block 384 serves as a middle-capacity indicating portion 384A when it is secured to the middle-capacity fixing hole 380 and serves as a large-capacity indicating portion 384B when it is secured to the large-capacity fixing hole 382 located at the front side of the middle capacity fixing hole 380.

The dimensions of the capacity indicating block 384 are set so that it can be neither attached to nor detached from the middle-capacity fixing hole 380 or the large-capacity fixing hole 382 when the base plate portion 332 and the top plate portion 334 are joined to each other (the state under which the substantially rear half portion of the second guide groove 312B is formed).

As described above, the second guide groove 312B is equipped with the capacity indicating portion at the position corresponding to the storage capacity of the disk medium 320 housed in the case 330. Specifically, when the storage capacity of the disk medium 320 is small (small storage capacity), the capacity indicating block 384 cannot be secured to each of the middle-capacity fixing hole 380 and the large-capacity fixing hole 382. In this case, the small-capacity indicating portion 378, which is integrally formed with the case 330, closes the rear end portion of the second guide groove 312B.

When the storage capacity of the disk medium 320 is the middle storage capacity, the middle-capacity indicating portion 384A which is the capacity indicating block 384 secured to the middle-capacity fixing hole 380 is embedded at the head side of the second guide groove 312B in the loading direction of the disk drive device 390. Further, when the storage capacity of the disk medium 320 is the large storage capacity, the capacity indicating block 384 secured to the large-capacity fixing hole 382 serves as the large-capacity indicating portion 384B, and seals the second guide groove 312B at the head side thereof in the loading direction of the disk drive device 390.

As shown in FIGS. 18A and 18B, a stamp serving as an identifying mark which is varied in accordance with the fixing hole to which it is secured is provided on the capacity indicating block 384. Specifically, the middle-capacity indicating portion 384A (the capacity indicating block 384 secured to the middle-capacity fixing hole 380) is provided with a stamp 386 indicating the numerical value "50" corresponding to the storage capacity thereof (for example, 50 GB), and the large-capacity indicating portion 384B (the capacity indicating block 384 secured to the large-capacity fixing hole 382) is provided with a stamp 388 indicating the numerical value "100" corresponding to the storage capacity thereof (for example, 100 GB).

The capacity indicating block 384 is secured so that the stamp 386 or 388 faces the outside of the case 330. Alternatively, the capacity indicating block 384 may be modified so that one of the stamps 386 and 388 is provided on each side of the capacity indicating block 384, and one stamp to be exposed to the outside is selected from the stamps in accordance with the fixing position of the capacity indicating block 384.

Construction of Disk Drive Device

Next, the disk drive device in which the disk cartridge 310 is loaded when disk medium 320 is used will be described.

In the following description, a disk drive device 390 supporting a disk medium 320 having the middle storage capacity and a disk drive device 400 supporting a disk medium 320 having the large storage capacity will be described as examples of the disk drive device of this embodiment.

FIG. 21A is a schematic plan view showing the inside of the disk drive device 390.

A mechanical stopper 394 serving as an identifying member and identifying means is disposed in the disk drive device 390 so as to project into a space in which the disk cartridge 310 is set, the space being formed so as to extend from an insertion port 392 through which the disk cartridge 310 is loaded (inserted). The mechanical stopper 394 is allowed to enter into the second guide groove 312B of the disk cartridge 310, and under the state that the disk cartridge 310 is loaded, it projects to a position on the moving locus (moving path) of the second guide groove 312B in the loading operation of the disk cartridge 310, at which the mechanical stopper 394 abuts against the middle-capacity indicating portion 384A (see FIG. 22B).

The mechanical stopper 394 is a contact-type switch (limit switch). When an object abuts against the front surface of the mechanical stopper 394, it outputs an ON signal to judging means 396 which is electrically connected to the mechanical stopper 394. In other cases, the mechanical stopper 394 outputs an OFF signal to the judging means 396.

In FIG. 21A, the judging means 396 is illustrated as being located outside the disk drive device 390. However, the judging means 396 may be a constituent part of the disk drive device 390 and accommodated therein. Further, the disk drive device 390 may be designed to have no judging means 396 because the storage capacity of the disk medium 320 is identified on the basis of the signal of only one mechanical stopper 394 as described in detail in Item of "Operation" described later.

FIG. 21B is a plan view showing the inside of the disk drive device 400. As shown in FIG. 21B, a movable fitting member 404 serving as an identifying member or constituting identifying means is equipped in the disk drive device 400 so that a part thereof is projected into a space in which the disk cartridge 310 is set and which intercommunicates with an insertion port 402 through which the disk cartridge 310 is loaded (inserted).

The movable engaging member 404 is designed in substantially "inverted L-shaped" in plan view. A short-side portion thereof located at the insertion port 402 side serves as a engaging portion 406 which can enter into the second guide groove 312B of the disk cartridge 310, and a long-side portion extending along the loading direction of the disk cartridge 310 serves as a detector 408.

When the engaging portion 406 projects onto the moving locus of the second guide groove 312B in the loading operation of the disk cartridge 310, the movable engaging member 404 is supported so as to be movable along the loading direction of the disk cartridge 310 at the right outside of the space in which the disk cartridge 310 is set, and one end portion of a spring 410 which is fixedly held in the disk drive device 400 at the other end portion thereof is fixedly fitted to the movable engaging member 404 to be urged toward the insertion port 402 side.

The spring 410 is provided not to interfere with the disk cartridge 310 being loaded. Any member may be used as the spring 410 insofar as it functions as the urging means for urging the movable engaging member 404 toward the insertion port 402 along the loading direction while permits a predetermined-distance movement of the movable engaging member 404 in a direction against the urging force, and a coil spring, a torsion spring, a band-shaped or linear rubber member or the like may be used.

Under this state, the engaging portion 406 of the movable engaging member 404 is located in the region of the insertion port 402, and it is engaged with the small-capacity indicating portion 378, the middle-capacity indicating portion 384A or the large-capacity indicating portion 384B, which seals the second guide groove 312B of the disk cartridge 310 when the disk cartridge 310 is loaded, so that it is moved forwardly (in the depth direction).

Further, the disk drive device 400 is equipped with a mechanical stopper 412. The mechanical stopper 412 projects to a position on the moving locus of the detector 408 of the movable engaging member 404, at which it can abut against the front end portion of the detector 408 of the movable engaging member 404 engaged with the large-capacity indicating portion 384B under the state that the disk cartridge 310 is loaded (see FIG. 23C).

The mechanical stopper 412 is a contact-type switch (limit switch). It outputs an ON signal to judging means 414, which is electrically connected to the mechanical stopper 412 when an object abuts against the front surface of the mechanical stopper 412, and in other states, it outputs an OFF signal to the judging means 414. In FIG. 21B, the judging means 414 is illustrated as being located outside the disk drive device 400. However, the judging means 414 actually serves as a part of the disk drive device 400 and thus it may be accommodated in the disk drive device 400 as described above.

Further, the disk drive device 400 is equipped with a non-contact switch 416 using a magnetic or optical detecting method. As shown in FIG. 23B, the non-contact switch 416 is disposed in the region of the moving path (locus) of the detector 408 of the movable engaging member 404 engaged with the middle-capacity indicating portion 384A when the disk cartridge 310 is loaded. When an object exists on the moving path concerned, it outputs an ON signal to the judging means 414 electrically connected thereto, and outputs an OFF signal to the judging means 414 in the other cases.

That is, in the disk drive device 400, the movable engaging member 404, the mechanical stopper 412 and the non-contact switch 416 constitute the identifying means of the present invention.

The dimensions and positional relationship of the respective parts of the movable engaging member 404 and the non-contact switch 416 are determined so that the detector 408 of the movable engaging member 404 (engaging portion 406) engaged with the small-capacity indicating portion 378 is not detected by the non-contact switch 416 under the loading state of the disk cartridge 310 (see FIG. 23A). Further, with respect to the detector 408 of the movable engaging member 404 (engaging portion 406) engaged with the large-capacity indicating portion 384B in the loading state of the disk cartridge 310, it may be detected or not detected by the non-contact switch 416. However, in this embodiment, the non-contact switch 416 detects the detector 408 of the movable engaging member 404 (engaging portion 406) engaged with the large-capacity indicating portion 384B in the loading state of the disk cartridge 310, as shown in FIG. 23C.

The disk drive device 390, 400 is suitably equipped with a spindle shaft which rotates while holding the disk medium 320, a recording/reproducing head for accessing the recording face of the disk medium 320 and one or both of information recording and reproduction of recorded information (that is, the disk drive device 390, 400 may be a dedicated recording device or dedicated reproducing device), a positioning mechanism for positioning the disk cartridge 310, a shutter opening/closing mechanism for opening/closing the opening 314 of the disk cartridge 310, a disk cartridge unloading mechanism, etc. (not shown).

Next, the operation of this embodiment will be described. First, a general operation of the disk cartridge 310 will be described, and then the operation on the capacity identification of the disk cartridge 310 will be described.

Operation of Disk Cartridge

In the disk cartridge 310 described above, the opening 314 is closed by the first shutter member 340 and the second shutter member 350 when the disk medium 320 is unused. That is, as shown in FIG. 19, the abutting portion 342A of the first shutter member 340 and the abutting portion 350 of the second shutter member 350 abut against each other, and the first shutter member 340 mainly closes the window portion 318 for the recording/reproducing head, and also the second shutter member 350 mainly closes the hub hole 316.

At this time, the rotation of the first shutter member 340 in the opening direction of the opening 314 is regulated because the lock pawl 362A of the lock means 360 is engaged with the lock engaging portion 344D. Meanwhile, the second shutter member 350 is made to keep the opening 314 close by the urging force of the torsion spring (not shown). Therefore, invasion of dust into the disk cartridge 310 can be prevented.

When the disk medium 320 is to be used (when information is to be recorded into the disk medium 320 or information recorded in the disk medium 320 is to be reproduced), the disk cartridge 310 is loaded (inserted) into the insertion port 392 of the disk drive device 390 with the front end portion 310A thereof being put at the leading edge in the insertion direction.

Through this loading, a guide projecting portion (not shown) of the disk drive device 390 is slid in the first guide groove 312A. The guide projecting portion sliding in the first guide groove 312A presses the lock release portion 362B backwardly to rotate the lock lever 362, whereby the lock state of the lock means is released.

Following further insertion of the disk cartridge 310 into the disk drive device 390, the guide projecting portion of the disk drive device 390 which further slides in the first guide groove 312A presses and moves the shutter engaging portion 348 of the first shutter member 340 backwardly while maintaining the lock released state of the lock means 360.

Accordingly, the arcuate guide wall portion 344 to which the moving force is applied through the shutter drawing portion 346 is rotated together with the shutter main body 342 while sliding along the cylindrical wall 332B. The second shutter member 350 is pressed by the press portion 342B of the shutter main body 342 through the pressed portion 350B, and rotated around the rotating shaft 352, whereby the opening 314 is opened as shown in FIG. 20. In this case, the window portion 344B of the first shutter member 340 is located at the rear side of the opening 334B, and the forward-facing half portion of the opening 314 is also opened.

When the disk cartridge 310 is inserted and reaches to a predetermined position of the disk drive device 390, it is positioned by a positioning mechanism (not shown). Under this state, the spindle shaft and the recording/reproducing head go into the opening 314 (the hub hole 316 and the window portion 318 for the recording/reproducing head), and information recording/reproduction is carried out while the disk medium 320 is rotated.

When use of the disk medium 320 is finished, the recording/reproducing head and the spindle shaft are retracted from the opening 314. In this case, the opening 314 of the disk cartridge 310 is closed while the disk cartridge 310 is unloaded from the disk drive device 390. That is, through the unloading of the disk cartridge 310 from the disk drive device 390, the shutter engaging portion 348 of the first shutter member 340 is pressed forward or the press portion 342B is pressed by the urging force of the torsion spring 354 which urges the second shutter member to return the first shutter member 340 to the initial position, and the second shutter member 350 is returned to the initial position by the urging force of the torsion spring 354.

Further, the lock lever 362 whose lock release lever 362B is disengaged from the guide projecting portion of the disk drive device 390 is also rotated in the direction opposite to the rotational direction when the lock lever 362 is locked by the urging force of the torsion spring 364, so that the lock pawl 362A is engaged with the lock engaging portion 344D. That is, the lock means 360 is returned to the initial state.

The above description corresponds to the case where the disk cartridge 310 is loaded into the disk drive device 390 in FIG. 22. The same applies to the case where the disk cartridge 310 is loaded into the disk drive device 400 in FIG. 23.

Operation on Capacity Identification of Disk Media

First, the operation when disk cartridges 310 housing disk media 320 having the above three kinds of recording capacities are loaded into the disk drive device 390 will be described. For convenience's sake, the disk cartridges 310 housing the small-capacity, middle-capacity and large-capacity disk media 320 are described as a disk cartridge 500, a disk cartridge 600 and a disk cartridge 700, respectively.

In the disk cartridge 500, no capacity indicating block 384 is secured to the middle-capacity fixing hole 380 or the large-capacity fixing hole 382 (the middle-capacity indicating portion 384A or the large-capacity indicating portion 384B are not provided), and only the small-capacity indicating portion 378 seals the second guide groove 312B.

In the disk cartridge 600, the capacity indicating block 384 is secured to the middle-capacity fixing hole 380 to form the middle-capacity indicating portion 384A, and the middle-capacity indicating portion 384A is located at the front of the second guide groove 312B in the loading direction to the disk drive device 390.

In the disk cartridge 700, the capacity indicating block 384 is secured to the large-capacity fixing hole 382 to form the large-capacity indicating portion 384B, and the large-capacity indicating portion 384B is located at the front of the second guide groove 312B in the loading direction to the disk drive device 390.

As shown in FIG. 22A, when the disk cartridge 500 is loaded into the disk drive device 390, the mechanical stopper 394 is inserted into the second guide groove 312B through the loading of the disk cartridge 500. In this case, the loading of the disk cartridge 500 is completed before the small-capacity indicating portion 378 abuts against the mechanical stopper 394. That is, the small-capacity indicating portion 378 and the mechanical stopper 394 are separated from each other when the disk cartridge 500 is loaded in the disk drive device 390, and the mechanical stopper 394 outputs the OFF signal to the judging means 396.

When the disk cartridge 600 is loaded into the disk drive device 390 as shown in FIG. 22B, the mechanical stopper 394 inserted into the second guide groove 312B through the loading abuts against the middle-capacity indicating portion 384A and the loading of the disk cartridge 600 is completed, so that the mechanical stopper 394 outputs the ON signal to the judging means 396.

On the other hand, when the disk cartridge 700 is loaded into the disk drive device 390 as shown in FIG. 22C, the mechanical stopper 394 inserted into the second guide groove 312B through the loading interferes (engages) with the large-capacity indicating portion 384B located at the front side of the middle-capacity indicating portion 384A (in the loading direction to the disk drive device 390) before the loading of the disk cartridge 700 is completed. That is, the loading of the disk cartridge 700 into the disk drive device 390 is prevented.

Accordingly, the disk drive device 390 can identify each of the disk cartridge 500 and the disk cartridge 600 from each other on the basis of the output of the mechanical stopper 394 (when the OFF signal is output, it is identified that the storage capacity of the disk medium 320 is the small-capacity, and when the ON signal is output, it is identified that the storage capacity of the disk medium 320 is the middle capacity), and the loading of the disk cartridge 700 having the disk medium 320 having a storage capacity exceeding a predetermined storage capacity (middle capacity) can be prevented from being loaded into the disk drive device.

Next, the operation when the disk cartridge 500, 600, 700 is loaded into the disk drive device 400 will be described. In FIG. 23, the spring 410 is omitted from the illustration.

When the disk cartridge 500 is loaded into the disk drive device 400 as shown in FIG. 23A, the engaging portion 406 inserted into the second guide groove 312B through the loading is pressed by the small-capacity indicating portion 378, and the movable engaging member 404 is forwardly moved together with the disk cartridge 500 against the urging force of the spring 410. Even when the loading of the disk cartridge 500 is completed, the detector 408 of the movable engaging member 404 does not reach the position at which the non-contact switch 416 is located, so that both the non-contact switch 416 and the mechanical stopper 412 output the OFF signals to the judging means 414.

When the disk cartridge 600 is loaded into the disk drive device as shown in FIG. 23B, the engaging portion 406 inserted into the second guide groove 312B through the loading is pressed by the middle-capacity indicating portion 384A, and the movable engaging member 404 is moved forward together with the disk cartridge 500 against the urging force of the spring 410. When the loading of the disk cartridge 600 is completed, the front end portion of the detector 408 of the movable fitting portion 404 is located between the mechanical stopper 412 and the non-contact switch 416. That is, the detector 408 does not abut against the mechanical stopper 412, however, it is detected by the non-contact switch 416. Accordingly, the mechanical stopper 412 outputs the OFF signal to the judging means 414 and the non-contact switch 416 outputs the ON signal to the judging means 414.

Further, when the disk cartridge 700 is loaded into the disk drive device 400 as shown in FIG. 23C, the engaging portion 406 inserted into the second guide groove 312B through the loading is pressed by the large-capacity indicating portion 384B, and the movable engaging member 404 is forwardly moved together with the disk cartridge 500 against the urging force of the spring 410. When the loading of the disk cartridge 700 is completed, the front end portion of the detector 408 of the movable fitting portion 404 abuts against the mechanical stopper 412, and both the mechanical stopper 412 and the non-contact switch 416 outputs the ON signal to the judging means 414.

Through the above operation, the disk drive device 400 can identify the disk cartridges 500, 600 and 700 on the basis of the combination of the outputs of the mechanical stopper 412 and the non-contact switch 416. Specifically, when a combination of the output signals of the mechanical stopper 412 and the non-contact switch 416 is OFF and OFF, it is determined that the storage capacity of the disk medium 320 is the small capacity, when the combination is OFF and ON, it is determined that the storage capacity of the disk medium 320 is the middle capacity, and when the combination is ON and ON, it is identified that the storage capacity of the disk medium 320 is the large capacity.

Further, when a disk cartridge 310 housing a disk medium 320 having a storage capacity larger than the disk medium 700, which has a capacity indicating portion at the front side of the large-capacity indicating portion 384B in the loading direction, is loaded into the disk drive device 400, the detector 408 of the movable engaging member 404 interferes (engages) with the mechanical stopper 412 before the loading is completed, and thus the loading is prevented. That is, a disk cartridge 310 housing a disk medium 320, which has a larger storage capacity exceeding the predetermined recording capacities, can be prevented from being loaded into the disk drive device.

In the disk drive device 400, the movable engaging member 404 is returned to the initial position by the urging force of the spring 410 when the disk cartridge 500, 600, 700 is unloaded. That is, the disk drive device 400 is set to a standby state (an accepting state for the disk cartridge 500, etc.).

Here, each of the capacity indicating portions (the small-capacity indicating portion 378, the middle-capacity indicating portion 384A, the large-capacity indicating portion 384B) for identifying the storage capacity of the disk medium 320 is located at the position corresponding to the storage capacity of the disk medium 320 in the second guide groove 312B formed in the loading direction to the disk drive device 390, 400. Therefore, in the disk drive device 390, 400, by setting, as a reference line, the moving path of the second guide groove 312B when the disk cartridge 310 is loaded and disposing the mechanical stopper 394 and the movable engaging member 404 on the reference line, it can be easily determined whether the respective capacity indicating portions are located at the positions of the different capacity indicating portions 378, 384A, 384B, etc., that is, the predetermined positions.

That is, the disk cartridge 310 enables the disk drive device 390, 400 identify the recording capacities of the disk media 320 on the basis of the positions of the plural different capacity indicating portions 378, 384A, 384B, etc., and also can simplify the construction of the disk drive device 390, 400.

As described above, according to the disk cartridge 310 of this embodiment, the recording capacities of the plural different disk media 320 can be identified by the disk drive device 390, 400 with a simple construction.

Further, in the disk cartridge 310, each capacity indicating portion 378, 384A, 384B is disposed so as to close the second guide groove 312B and project from the case 330. In addition, a capacity indicating portion, which supports a larger (higher-level) storage capacity, is disposed at a position nearer to the front edge of the case (in the loading direction), so that the loading of the disk medium 320 into a lower capacity disk drive device supporting a disk medium having a smaller storage capacity can be prevented because each capacity indicating portion 384A, 384B interfere with the mechanical stopper 394 and the movable engaging member 404 (mechanical stopper 412). Therefore, the disk cartridge 310 in which the higher capacity disk medium 320 is housed can be prevented from being loaded into the lower capacity disk drive device which cannot record/reproduce information in/from the higher capacity disk medium 320.

That is, for example, the disk cartridge 700 cannot be loaded into the disk drive device 390 which cannot record/reproduce information in/from the disk medium 320 having the large capacity housed therein.

Further, since the base plate portion 332 of the case 330 is provided with the middle capacity fixing hole 380 and the large-capacity fixing hole 382 to which the capacity indicating block 384 is detachably fixed, the case 330 can be used commonly for disk media 320 having different recording capacities. That is, the disk cartridges 500, 600, 700 commonly use cases 330, which have the same shape and are manufactured using the same metal mold, and can make the disk drive device 390, 400 identify the storage capacity of the disk medium 320 in accordance with the presence or absence of the capacity indicating block 384 and selection of the fixing position.

Accordingly, the case 330 can be made common to the disk cartridges 310, so that the parts management of the cases 330 can be easily performed, the number of metal molds can be reduced and the manufacturing cost can be reduced. Further, the case 330 can be recycled as a product. For example, when the disk medium 320 housed in the case is exchanged, the fixing position of the capacity indicating block 384 may be changed to support the change of the storage capacity of the disk medium 320.

Further, since the capacity indicating block 384 is provided with the stamps 386 and 388 corresponding to the fixing position thereof (the storage capacity of the disk medium 320), the storage capacity of the disk medium 320 can be visually identified easily. That is, the storage capacity of the disk medium 310 can be checked without loading the disk cartridge 310 into the disk drive devices 390 and 400, which is very convenient. Conversely, printing, stamping, attachment of labels, etc. onto the surface of the case 330 can be abolished, and the common use of the cases 330 can be further facilitated.

According to the disk drive devices 390 and 400, by merely disposing the mechanical stopper 394 and the movable fitting portion 404 on the moving path (locus) of the second guide groove 312B (the respective capacity indicating portions 378, 384A, 384B) when the disk cartridge 310 is loaded, the recording capacities of the disk media 320 can be identified on the basis of the position of each of the capacity indicating portions 378, 384A and 384B, with a simple construction.

As described above, according to the disk drive device 390, 400 of this embodiment, the storage capacity of the disk medium 320 housed in the disk cartridge 310 can be identified with the simple construction.

In the disk drive device 390, when the storage capacity of the disk medium 320 housed in the disk cartridge loaded in the disk device 390 is larger than a predetermined set storage capacity (middle-capacity), for example when the disk medium 320 housed in the disk cartridge 700 is an higher capacity disk medium with respect to the disk drive device 390, the mechanical stopper 394 interferes with the capacity indicating portion 384A to prevent the loading of the disk cartridge 700 concerned, and thus the construction of the disk drive device 390 is conveniently simplified.

Further, in the disk drive device 400 in which three kinds of disk media 500, 600, 700 can be loaded, the loading of the disk cartridge 310 having the disk medium 320 having a larger storage capacity (higher-level) than the disk cartridge 700 can be prevented with a simple construction.

Specifically, the disk cartridge 700 on which neither data recording nor data reproduction can be performed (the disk medium 320 having a large storage capacity) is not loaded into the disk device 390, and it is unnecessary to identify the storage capacity of the disk medium 320 housed in the disk cartridge 700. Therefore, the construction of this embodiment is simple. That is, in the disk drive device 390, it is unnecessary to provide a separate sensor (for example, the non-contact switch 416) for identifying the storage capacity of the large-capacity disk media 320. Conversely, occurrences of erroneous identification, which are expected to occur when no separate sensor is provided and the loading of the disk cartridge 700 is allowed, for example, occurrence of a situation in which it is impossible to identify the disk cartridges 500, 600 when the non-contact switch 416 is not equipped to the disk drive device 400, can be prevented with surety.

Further, in the disk drive device 400 in which three kinds of disk media 500, 600 and 700 can be loaded, the loading of the disk cartridge 310 having the disk medium 320 with a larger storage capacity (the capacity indicating portion located at the front side of the capacity indicating portion 384B) than that of the disk cartridge 700 can be prevented with the simple construction as described above, and this is convenient as in the case of the disk drive device 390. That is, a separate sensor for identifying the disk cartridge 310 having the large-capacity disk medium 320 larger than that of the disk cartridge 700 is unnecessary and thus the construction is simplified.

As described above, according to the disk drive device 390, 400 of this embodiment, the disk cartridge 310 housing an higher capacity disk medium 320 having an upper function (large storage capacity) can be prevented from being loaded into the disk drive device by mistake, and data recorded in the higher capacity disk medium 320 can be protected from damage. That is, the disk drive devices 390 and 400 having the protect function for preventing the loading of the disk cartridge 310 housing the higher capacity disk medium 320 can be achieved. In addition, since the protect function can be implemented by using the capacity identifying means, the construction can be simplified.

In the above embodiments, each of the capacity indicating portions 378, 384A, 384B are equipped along the second guide groove 312B, however, the present invention is not limited to this construction. Each of the capacity indicating portions 378, 384A, 384B may be merely disposed at the position corresponding to the storage capacity of the disk medium 320 on the predetermined reference line along the loading direction to the disk drive device 390 or the like. Accordingly, for example, each capacity indicating portion 378, etc. may be disposed on a virtual reference line on the upper surface or lower surface of the case, or they may be disposed in a groove, which is formed at the upper side, a lower side or the like of the first guide groove 312A in parallel to the first guide groove 312A.

Further, in the above embodiments, the two fixing holes (the middle-capacity fixing hole 380 and the large-capacity fixing hole 382) are provided to support the three kinds of recording capacities of the disk media 320 for the same case 330. However, the present invention is not limited to this construction. For example, only one fixing hole may be provided or three or more fixing holes may be provided. In addition, the small-capacity indicating portion 378 may be provide so as to be engagedly supported in the fixing hole. Further, the middle-capacity fixing hole 380 and the large-capacity fixing hole 382 may be provided on the lower surface of the outer wall 376 of the top plate portion 334.

In place of the middle-capacity fixing hole 380, etc., a fixing hole intercommunicating with the inside of the case 330 may be formed in the bottom portion of the second guide groove, and a capacity identifying piece which is fixed to the peripheral portion of the fixing hole concerned without falling off may be projected from the inside of the case 330 into the second guide groove 312B. Further, in place of the middle-capacity fixing hole 380 and the large-capacity fixing hole 382 serving as the fixing portions from which the capacity indicating blocks 384 are detachable, the middle-capacity indicating portion 384A, and the like, which are formed integrally with the case 330 may be provided. In this case, it is difficult to use the case 330 commonly.

Further, the above-described embodiments are constructed so that the disk cartridge 310 housing the disk medium 320 having a larger storage capacity than the storage capacity set for the disk drive device is prevented from being loaded into the disk drive device. However, the present invention is not limited to this construction. For example, a non-contact switch for detecting each capacity indicating portion 378 or the movable engaging member 404 when it is located at a predetermined position may be provided in place of the mechanical stopper 394, 414, so that the disk cartridge 310 housing the disk medium 320 having a larger capacity than the storage capacity set in the disk drive device is allowed to be loaded. In this case, the order of the positions of the respective capacity indicating portions 378, 384A, 384B in the second guide groove may be changed.

Still further, in the above-described embodiments, the stamps 386 and 388 are provided on the capacity indicating blocks 384, however, the present invention is not limited to this style. For example, in place of the stamps 386 and 388, the capacity indicating blocks 384 may be provided with numerical values or the like formed in the same process as the resin shaping process, or colored with different colors corresponding to the recording capacities of the disk media 320. The stamp is not limited to the numerical value indicating the storage capacity, but a character, a symbol or the like may be selected.

Still further, in the above-described embodiments, two or three kinds of disk cartridges 310 are loaded in the disk drive devices 390 and 400, and the storage capacity identification can be performed. However, the present invention is not limited to this. For example, the disk drive devices 390 and 400, may be designed so that disk cartridges 310 having four or more kinds of recording capacities can be loaded in the disk drive devices 390 and 400. In this case, in order to identify many recording capacities, a plurality of non-contact switches 416 may be provided, or in place of the plurality of non-contact switches 416, a distance sensor for detecting the distance from the predetermined position of each of the capacitance identifying portions 378, etc. or the movable engaging member 404 may be equipped, and the sensor may output an analog signal.

Still further, in the above-described embodiments, the disk cartridge 310 is designed so that the opening 314 of case 330 is opened/closed by the first shutter member 340 and the second shutter member 350, which are rotated in the different rotational directions. However, the present invention is not limited to this. For example, the disk cartridge 310 may be designed so that the opening 314 is opened/closed by a rectangular shutter member which is slid on the outer surface of the case 330.

Still further, the above-described embodiments are designed so that the capacity indicating portions 378, 384A and 384B are equipped to the disk cartridges, and the capacity identifying means (mechanical stopper 394, the movable engaging member 404, etc.) is equipped to the disk drive device 390, etc. This construction may be applied to a recording tape case and a recording/reproducing device in which the recording tape cassette is loaded. The recording tape cassette may be designed to house a tape for audio, video, information recording/reproduction of a computer or the like, and it may be a single-reel type. A device in which the recording tape cassette is loaded may be exclusively used for recording or reproduction.

The present invention is not limited to the above-described embodiments, and various modifications may be made to these embodiments. For example, the same effects can be achieved by replacing the prism provided to the write protect portion by a reflection mirror in the first to third embodiments.

As described above, according to the present invention, a cartridge, which can maintain the dust-proof performance, prevent occurrence of mis-detection due to deformation of the write protect portion and enable the drive device to identify the recording capacities of plural different disk media with a simple construction, and a drive device using the cartridge can be implemented.

What is claimed is:

1. A recording medium cartridge for use with a light source, the cartridge comprising:
   a case;
   a recording medium accommodated in the case for at least one of reading and writing information to and from the recording medium;
   a write protection portion formed on the case, the write protection portion including a switching means, which, when receiving light from the light source, re-radiates the light in one of first and second amounts, the first amount indicating that information may be written to the recording medium, and the second amount indicating that information cannot be written to the recording medium, wherein the switching means is operable for selecting which light amount to re-radiate.

2. The cartridge of claim 1, wherein said switching means is a deflector for switching the re-radiated light amount by switching the position of the deflector.

3. The cartridge of claim 2, wherein said deflector is a prism.

4. The cartridge of claim 3, wherein said prism is rotatably disposed, and the location of a prism face is changed by the rotation of said prism.

5. The cartridge of claim 2, wherein said deflector is a reflection mirror.

6. The cartridge of claim 5, wherein said reflection mirror is slidably disposed, and the position of said reflection mirror is switched by the sliding movement of said reflection mirror.

7. The cartridge of claim 1, wherein a deflector is housed in said case, and said case comprises: an incident-light transmitting plate for transmitting light therethrough, which light is incident to said incident-light transmitting plate and allowing the incident light to reach said deflector; and an emission-light transmitting plate for allowing transmission therethrough of light from said deflector and for emitting the light therefrom.

8. The cartridge of claim 1, wherein said switching means is an interception plate, which is switched to enter into or retract from the optical path of light emitted from said case.

9. The cartridge of claim 1, wherein said switching means is a reflection member including sites that differ in reflectivity, the light amount being switched by switching the position of a site to which the light is incident.

10. The cartridge of claim 9, wherein said reflection member includes a transparent member and an opaque member.

11. The cartridge of claim 9, wherein said reflection member includes a white site and a black site.

* * * * *